(12) United States Patent
Riley

(10) Patent No.: US 10,927,750 B2
(45) Date of Patent: Feb. 23, 2021

(54) SYSTEMS AND METHODS OF COMPRESSION IGNITION ENGINES

(71) Applicant: Nautilus Engineering, LLC, Wichita, KS (US)

(72) Inventor: Matthew T. Riley, Derby, KS (US)

(73) Assignee: NAUTILUS ENGINEERING, LLC, Wichita, KS (US)

( * ) Notice: Subject to any disclaimer, the term of this patent is extended or adjusted under 35 U.S.C. 154(b) by 0 days.

(21) Appl. No.: 15/948,089

(22) Filed: Apr. 9, 2018

(65) Prior Publication Data

US 2018/0223723 A1   Aug. 9, 2018

Related U.S. Application Data

(63) Continuation-in-part of application No. 15/400,813, filed on Jan. 6, 2017, now Pat. No. 10,125,666.
(Continued)

(51) Int. Cl.
*F02B 23/04* (2006.01)
*F02B 75/04* (2006.01)
(Continued)

(52) U.S. Cl.
CPC ............ *F02B 23/04* (2013.01); *F02B 75/042* (2013.01); *F02D 41/3035* (2013.01); *F02F 1/22* (2013.01);
(Continued)

(58) Field of Classification Search
CPC ...... F02B 23/04; F02B 23/0639; F02B 19/14; F02B 75/042; F02B 2275/40; F02P 19/026; F02D 41/3035; F02D 41/3047; F02D 41/3041; F02D 41/006; F02F 3/24; F02F 3/28; F02F 1/22; F02F 1/4235; Y02T 10/125
See application file for complete search history.

(56) References Cited

U.S. PATENT DOCUMENTS 1,620,124 A   3/1927   Nielsen
2,151,218 A   3/1939   Lutz
(Continued)

FOREIGN PATENT DOCUMENTS

CH           177024 A      5/1935
CN        109072763 A     12/2018
(Continued)

OTHER PUBLICATIONS

Written Opinion and Search Report for PCT/US2017/012611 dated Jul. 20, 2017.
(Continued)

*Primary Examiner* — Grant Moubry
(74) *Attorney, Agent, or Firm* — Kutak Rock LLP

(57) ABSTRACT

Apparatuses, systems and method for utilizing multi-zoned combustion chambers (and/or multiple combustion chambers) for achieving compression ignition (and/or spark-assisted or fuel-assisted compression ignition) in an internal combustion engine are provided. In addition, improved apparatuses, systems and methods for achieving and/or controlling compression ignition (and/or spark-assisted or fuel-assisted compression ignition) in a "Siamese cylinder" internal combustion engine are provided.

14 Claims, 36 Drawing Sheets

US 10,927,750 B2

Page 2

Related U.S. Application Data

(60) Provisional application No. 62/627,029, filed on Feb. 6, 2018, provisional application No. 62/554,429, filed on Sep. 5, 2017, provisional application No. 62/500,475, filed on May 2, 2017, provisional application No. 62/490,056, filed on Apr. 26, 2017, provisional application No. 62/483,191, filed on Apr. 7, 2017, provisional application No. 62/442,336, filed on Jan. 4, 2017, provisional application No. 62/417,897, filed on Nov. 4, 2016, provisional application No. 62/344,230, filed on Jun. 1, 2016, provisional application No. 62/337,727, filed on May 17, 2016, provisional application No. 62/326,594, filed on Apr. 22, 2016, provisional application No. 62/295,445, filed on Feb. 15, 2016, provisional application No. 62/286,795, filed on Jan. 25, 2016, provisional application No. 62/278,919, filed on Jan. 14, 2016.

(51) Int. Cl.
| | | |
|---|---|---|
| *F02F 3/24* | (2006.01) | |
| *F02F 1/22* | (2006.01) | |
| *F02F 1/42* | (2006.01) | |
| *F02P 19/02* | (2006.01) | |
| *F02D 41/30* | (2006.01) | |
| *F02B 19/14* | (2006.01) | |
| *F02B 23/06* | (2006.01) | |
| *F02D 41/00* | (2006.01) | |

(52) U.S. Cl.
CPC .............. *F02F 1/4235* (2013.01); *F02F 3/24* (2013.01); *F02P 19/026* (2013.01); *F02B 19/14* (2013.01); *F02B 23/0639* (2013.01); *F02B 2275/40* (2013.01); *F02D 41/006* (2013.01); *F02D 41/3041* (2013.01); *F02D 41/3047* (2013.01); *Y02T 10/12* (2013.01)

(56) References Cited

U.S. PATENT DOCUMENTS

| | | | |
|---|---|---|---|
| 2,190,537 A | | 2/1940 | Wiebicke |
| 2,206,322 A | * | 7/1940 | Huesby ................ F02B 19/04 123/265 |
| 2,221,156 A | | 11/1940 | Swanson |
| 2,256,776 A | | 9/1941 | George |
| 2,505,999 A | | 5/1950 | Smith |
| 2,514,730 A | | 7/1950 | Sonderegger |
| 2,590,000 A | | 3/1952 | Ferguson |
| 2,662,513 A | * | 12/1953 | Bodine, Jr. ............ F02B 23/08 123/281 |
| 2,719,514 A | | 10/1955 | Schilling |
| 2,735,416 A | | 2/1956 | Ferguson |
| 2,739,578 A | | 3/1956 | Stump |
| 3,386,422 A | | 6/1968 | Eyzat |
| 3,583,372 A | | 6/1971 | Hoffmann |
| 3,738,322 A | | 6/1973 | Smith |
| 3,738,332 A | | 6/1973 | Eyzat et al. |
| 4,004,557 A | | 1/1977 | Acker |
| 4,164,915 A | | 8/1979 | Kulhavy et al. |
| 4,170,966 A | | 10/1979 | Schmidt |
| 4,258,680 A | | 3/1981 | Eckert |
| 4,378,764 A | | 4/1983 | Jorgensen |
| 4,428,193 A | | 1/1984 | Papp |
| 4,483,289 A | | 11/1984 | Paul et al. |
| 4,557,231 A | * | 12/1985 | Thery ................... F02B 23/00 123/193.3 |
| 4,570,589 A | * | 2/1986 | Fletcher ............... F02B 77/085 123/193.6 |
| 4,662,330 A | | 5/1987 | Shioyama et al. |
| 4,738,227 A | * | 4/1988 | Kamo .................... F02B 9/04 123/23 |
| 5,009,207 A | | 4/1991 | Merritt |
| 5,060,609 A | | 10/1991 | Merritt |
| 5,083,530 A | | 1/1992 | Rassey |
| 5,117,789 A | | 6/1992 | Merritt |
| 5,195,486 A | | 3/1993 | Ishii |
| 5,515,823 A | | 5/1996 | Kawamura |
| 5,560,326 A | * | 10/1996 | Merritt .................... F02B 19/02 123/51 AA |
| 5,664,540 A | * | 9/1997 | Matsuoka ............ F02B 19/165 123/254 |
| 5,664,541 A | * | 9/1997 | Yoo ........................ F02B 19/04 123/275 |
| 5,701,864 A | * | 12/1997 | Tanigawa ................ F02B 19/04 123/290 |
| 5,701,868 A | | 12/1997 | Tomisawa |
| 6,032,617 A | | 3/2000 | Willi et al. |
| 6,119,650 A | | 9/2000 | Tanigawa et al. |
| 6,557,520 B2 | | 5/2003 | Roberts, Jr. |
| 6,561,139 B2 | * | 5/2003 | Guy ......................... F02B 1/12 123/26 |
| 6,578,533 B1 | | 6/2003 | Gray, Jr. |
| 6,668,788 B2 | | 12/2003 | Agama |
| 6,817,323 B2 | | 11/2004 | Notaras et al. |
| 6,854,438 B2 | * | 2/2005 | Hilger ................. F02M 21/0269 123/143 B |
| 7,121,254 B2 | | 10/2006 | Wickman et al. |
| RE40,500 E | | 9/2008 | Doers et al. |
| 7,438,044 B2 | | 10/2008 | Webster et al. |
| 8,205,593 B2 | | 6/2012 | de Versterre |
| 8,327,821 B2 | | 12/2012 | Guibert |
| 10,125,666 B2 | | 11/2018 | Riley |
| 2003/0041836 A1 | * | 3/2003 | Roberts, Jr. ............ F02B 19/04 123/276 |
| 2005/0235946 A1 | | 10/2005 | Doers et al. |
| 2007/0014459 A1 | | 1/2007 | Palmer |
| 2007/0084428 A1 | | 4/2007 | Weaver |
| 2007/0144459 A1 | | 6/2007 | Fiveland |
| 2007/0163535 A1 | | 7/2007 | Walter |
| 2008/0060625 A1 | | 3/2008 | Raymond et al. |
| 2008/0314363 A1 | | 12/2008 | Bailey |
| 2008/0314373 A1 | | 12/2008 | Simo et al. |
| 2011/0224882 A1 | | 9/2011 | Makino et al. |
| 2013/0291827 A1 | | 11/2013 | Hah |
| 2014/0158067 A1 | | 6/2014 | Woo et al. |
| 2014/0182566 A1 | | 7/2014 | Kreuter |
| 2015/0315957 A1 | | 11/2015 | Bergin et al. |
| 2017/0204777 A1 | | 7/2017 | Riley |
| 2018/0223723 A1 | | 8/2018 | Riley |
| 2019/0078499 A1 | | 3/2019 | Riley |

FOREIGN PATENT DOCUMENTS

| | | |
|---|---|---|
| CN | 110914525 A | 3/2020 |
| DE | 645974 C | 6/1937 |
| EP | 0902175 A1 | 3/1999 |
| EP | 3402969 | 11/2018 |
| EP | 3607188 | 2/2020 |
| FR | 730529 A | 8/1932 |
| GB | 06413 A | 4/1914 |
| GB | 1156821 | 7/1969 |
| JP | 02308920 A | 12/1990 |
| JP | 03003920 A | 1/1991 |
| JP | 04136415 A | 5/1992 |
| JP | 04318218 A | 11/1992 |
| JP | 06193446 A | 7/1994 |
| JP | 2819054 | 10/1998 |
| JP | 11-193720 | 7/1999 |
| JP | 2003-083071 | 3/2003 |
| JP | 2019505731 A | 2/2019 |
| KR | 10-20180112791 A | 10/2018 |
| TW | 201730429 A | 9/2017 |
| TW | 201842270 A | 12/2018 |

(56) References Cited

FOREIGN PATENT DOCUMENTS

| WO | 2017123478 | 7/2017 |
|---|---|---|
| WO | 2018187811 | 10/2018 |

OTHER PUBLICATIONS

Written Opinion and Search Report for PCT/US2018/026743 dated Jul. 17, 2018.
Patakon website address: http://www.pattakon.com/pattakonPatBam.htm; last accessed Aug. 29, 2018.
Communication pursuant to Rules 161(2) and 162 EPC received for EP Application No. 17738762.8 dated Aug. 29, 2018, 3 pages.
International Preliminary Report on Patentability received for PCT Application No. PCT/US2017/012611, dated Jul. 26, 2018, 11 pages.
International Search Report and Written Opinion received for PCT Application No. PCT/US2017/012611 dated Apr. 24, 2017, 12 pages.
International Search Report and Written Opinion Received for PCT Application No. PCT/US2018/026743, dated Jul. 17, 2018, 12 pages.
Notice of Allowance received for U.S. Appl. No. 15/400,813, dated Sep. 25, 2018, 7 pages.
Non-Final Office Action received for U.S. Appl. No. 16/188,792, dated Jun. 11, 2019, 13 pages.
"International Preliminary Report on Patentability Received for PCT Application No. PCT/US2018/026743, dated Oct. 17, 2019, 10 pages".
"Notice of Allowance Received for U.S. Appl. No. 16/188,792, dated Jan. 14, 2020, 17 pages.", 17.
Search Report for European Patent Application No. 18781085.8 dated Jan. 11, 2021.

* cited by examiner

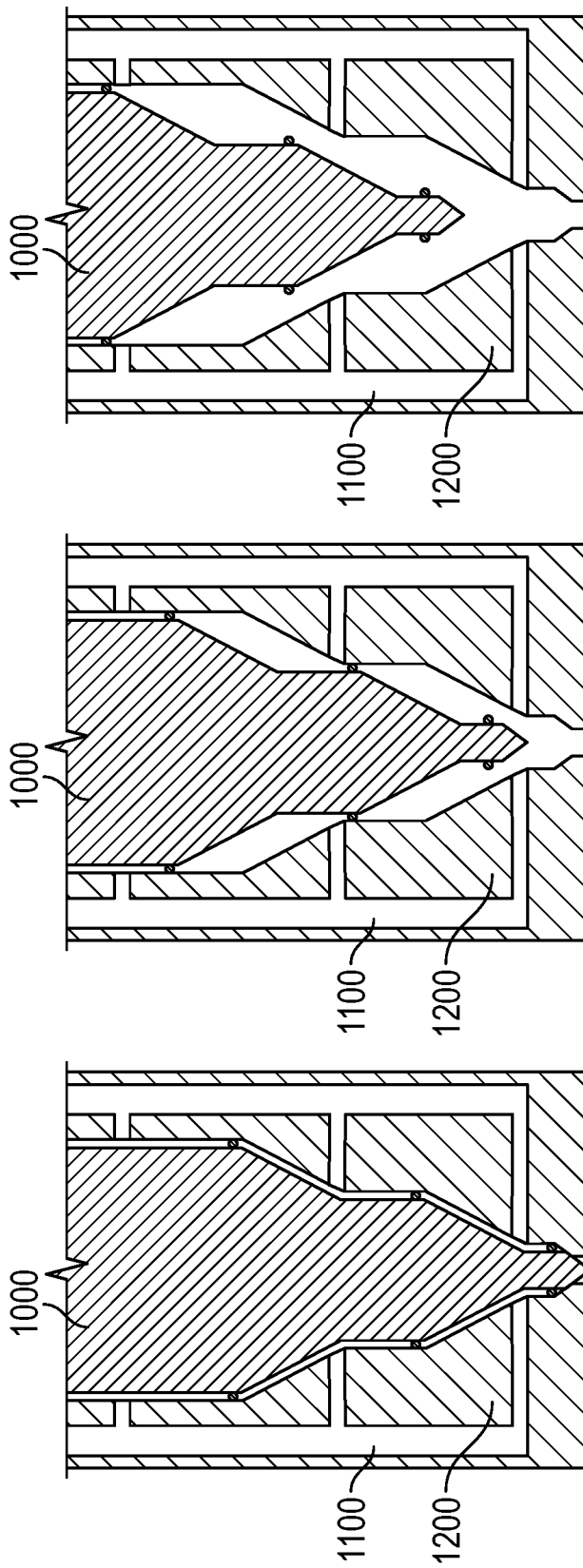

SYSTEMS AND METHODS OF COMPRESSION IGNITION ENGINES

CROSS-REFERENCE TO RELATED APPLICATIONS

This application claims priority pursuant to 35 U.S.C. 119(e) to co-pending U.S. Provisional Patent Application Ser. No. 62/483,191, filed Apr. 7, 2017, and co-pending U.S. Provisional Patent Application Ser. No. 62/490,056, filed Apr. 26, 2017, and co-pending U.S. Provisional Patent Application Ser. No. 62/500,475, filed May 2, 2017, and co-pending U.S. Provisional Patent Application Ser. No. 62/554,429, filed Sep. 5, 2017, and co-pending U.S. Provisional Patent Application Ser. No. 62/627,029, filed Feb. 6, 2018, and is a continuation in part of U.S. patent application Ser. No. 15/400,813 filed Jan. 6, 2017 which claims priority pursuant to 35 U.S.C. 119(e) to co-pending U.S. Provisional Patent Application Ser. No. 62/278,919, filed Jan. 14, 2016, and co-pending U.S. Provisional Patent Application Ser. No. 62/286,795, filed Jan. 25, 2016, and co-pending U.S. Provisional Patent Application Ser. No. 62/295,445, filed Feb. 15, 2016, and co-pending U.S. Provisional Patent Application Ser. No. 62/326,594, filed Apr. 22, 2016, and co-pending U.S. Provisional Patent Application Ser. No. 62/337,727, filed May 17, 2016, and co-pending U.S. Provisional Patent Application Ser. No. 62/344,230, filed Jun. 1, 2016, and co-pending U.S. Provisional Patent Application Ser. No. 62/417,897, filed Nov. 4, 2016, and co-pending U.S. Provisional Patent Application Ser. No. 62/442,336, filed Jan. 4, 2017, the entire disclosures of which are incorporated herein by reference.

This application also incorporates by reference the entirety of U.S. Non-Provisional patent application Ser. No. 15/400,813, filed Jan. 6, 2017.

FIELD OF THE INVENTION

The present inventive concept relates generally to apparatuses, systems and methods for achieving compression ignition (and/or spark-assisted or fuel-assisted compression ignition) in an internal combustion engine. More particularly, the present inventive concept is concerned with improved apparatuses, systems and method for utilizing multi-zoned combustion chambers (and/or multiple combustion chambers) for achieving compression ignition (and/or spark-assisted or fuel assisted compression ignition) in an internal combustion engine. In addition, the present inventive concept is concerned with improved apparatuses, systems and methods for achieving and/or controlling compression ignition (and/or spark-assisted or fuel-assisted compression ignition) in internal combustion engines, including "Siamese cylinder" internal combustion engines.

BACKGROUND OF THE INVENTION

Virtually since the invention of the internal combustion engine, people have been trying to increase efficiency and lower emissions. Two common categories of internal combustion engines are spark ignition and compression ignition (as used herein, the phrase "compression ignition" includes, but is not necessarily limited to: Diesel/Stratified Charge Compression Ignition (SCCI), Homogeneous Charge Compression Ignition (HCCI), Homogenous Compression Ignition (HCI), Homogeneous Charge with Spark Ignition (HCSI), Gas Direct Compression Ignition (GDCI), diesel and other fuels, as well as fuel blends, carbureted and/or injected as different types of fuel and fuel blend compression ignition, spark-assisted ignition, fuel-assisted ignition, etc.).

Spark ignition engines utilize a spark from a spark plug to ignite the combustion process of the air-fuel mixture within the combustion chamber of the engine. In contrast, compression ignition engines utilize temperature and density increases in the air-fuel mixture within the combustion chamber to auto-ignite the combustion process. Spark ignition engines typically have much lower efficiency than compression ignition engines. Because the flame propagates from the point of ignition (i.e. the spark), it results in incomplete combustion. In compression ignition engines, no flame front exists, instead because the combustion is initiated by increased pressure, the ignition is uniformed, and/or takes place, within multiple places within the combustion chamber, causing nearly simultaneous/instant ignition throughout the entire air-fuel mixture and resulting in more complete combustion. Conventional compression ignition engines must be carefully designed to provide for combustion just before top dead center, taking into account the timing of the fuel injected (typically, direct injected to control combustion cycle) into the combustion chamber, to avoid catastrophic damage to the engine if combustion occurs too early.

Due to the nearly instantaneous ignition of the entire air-fuel mixture within the combustion chamber of a compression ignition engine, an enormous amount of pressure is created within the combustion chamber all at once, as opposed to the more gradual increase in pressure that would be created as the flame propagates through the combustion chamber of a spark ignition engine. This immediate pressure increase is particularly high in homogeneous charge compression ignition (HCCI) engines. As such, engine manufacturers have been required to carefully control compression ignition engines such that the ignition occurs when the piston of the engine is at top dead center or moving down from top dead center. Otherwise, if the ignition occurs before the piston reaches top dead center, catastrophic engine failure will result (i.e. including, but not limited to, bent piston rods, collapsed piston skirts, blown head gaskets, etc.). Nevertheless, such precise control requirements necessitate extremely tight design parameters, limiting compression ratio and/or operating temperature for such engines. Too high a compression ratio can result in auto-ignition before top dead center. Reducing compression ratio, however, increases the temperature required to achieve auto-ignition, thus making the engine difficult to run in cold temperature environments.

U.S. Pat. No. 6,557,520 to Roberts, Jr., the entire disclosure of which is incorporated herein by reference, discloses a multi-zoned combustion chamber and method for combustion control in compression ignition engines that helps to control the immediate combustion pressure surge created in a compression ignition engine. Roberts, Jr. physically segregates the combustion chamber into multiple smaller, sealed, chambers (e.g. a primary chamber and at least a secondary chamber, as well as possibly a tertiary, or more subsequent chambers) through a stepped shaped design of the piston and cylinder head. Specifically, referring to FIG. 1, Roberts, Jr. discloses a cup-shaped piston 140 that has a central recess 141 surrounded by a circumferential protruding wall 142 portion of the piston. The cylinder head 132 of Roberts, Jr. is configured to matingly receive the cup-shape of the piston and has a central protuberance 133 surrounded by a circumferential recess 134. The central recess 141 of the piston is adapted to slidingly receive the central protuberance 133 of the head, and the circumferentially protruding wall 142 is adapted to be slidingly received between the piston cylinder 130 and the central protuberance 133 and the recess 134. FIGS. 2-8 illustrate the multiphase sequence of the internal combustion processes of the engine of Roberts, Jr., in which combustion is initiated in the primary chamber 143 while delaying combustion in the secondary chamber 144.

FIG. 2 illustrates a first phase, which begins after a normal induction stroke, in which air is introduced into the combustion chamber 146. Fuel is delivered and mixed into the combustion system through valve 41 and/or fuel injector 62.

FIG. 3 illustrates a later, second phase in the compression stroke of the combustion chamber 146. This phase illustrates the initiation of chemical reactions within the unburned fuel/air masses 150, 151 in the primary chamber 143 and the secondary chamber 144 due to compression heating. At this phase, the combustion chamber 146 is separated into two individual combustion chambers (the primary chamber 143 and the secondary chamber 144) due to the design and motion of the piston and the design of the combustion chamber.

FIG. 4 illustrates a third phase where the fuel/air mass 150 trapped within the primary chamber 143 undergoes a compression ignition process. When compression ignition is undertaken, rapid combustion of the fuel/air mass 150 in the primary chamber 143 occurs. The size of the primary chamber 143 modulates the amount of energy trapped in the primary chamber 143 so that when the fuel/air mass 150 ignites, the pressure and temperature that is achieved can be controlled through design. The pressure required to ignite the fuel/air mass 150 is a function of thermodynamic interaction. The primary chamber 143 and the secondary chamber 144 have different compression and/or pressure ratio values, so that the fuel/air mass 151 within the secondary chamber 144 will not auto-ignite due to compression from the piston.

FIG. 5 illustrates a fourth phase where the compression ignition process proceeds to a rapid combustion process within the primary chamber 143. Since the primary chamber 143 is being utilized as an ignition control for the secondary chamber 144, the timing after TDC is not necessary.

FIG. 6 illustrates a fifth phase where the fuel/air mass 150 has been converted to a high pressure, high temperature, combusting gas 150A within the primary chamber 143. In Roberts, Jr., the fifth phase occurs after TDC, when the piston 140 is moving in the direction of a down stroke 44. In this fifth phase, the combusting gas 150A continues to expand and remains segregated from the remaining fuel/air mass 151 (or remaining combustible gas) in the secondary chamber 144.

FIG. 7 illustrates a sixth phase where the piston 140 has moved to a predetermined position where segregation of the primary chamber 143 and secondary chamber 144 is eliminated. The sixth phase occurs after TDC, as the piston continues to move in the direction of a down stroke 44. In this phase, combustion of the remaining fuel/air mass 151 in the secondary chamber 144 is initiated. FIG. 7 shows the combusting gas 150A from the primary chamber 143 thermodynamically communicating with the remaining fuel/air mass 151 of the secondary chamber 144 and causing it to be converted into a remaining combusting gas 151A. After the primary chamber 143 and secondary chamber 144 have been desegregated and the combusting gas 150A of the primary chamber 143 is allowed to communicate with the secondary chamber 144, the combusting gas 150A in the primary chamber 143 and the thermodynamic state of the primary chamber 143 is used as the ignition source for the remaining fuel/air mass 151 in the secondary chamber 144.

FIG. 8 illustrates a seventh phase where all of the remaining fuel/air mass 151 of the secondary chamber 144 has been ignited and converted into a combusting gas 151A. Ignition of the secondary chamber can be by compression ignition, direct flame contact, or a combination thereof.

The multi-phase combustion process of Roberts, Jr. allows the combustion process to be initiated by compression caused by the piston, without requiring precise control of the reaction to ensure it occurs when the piston is at or past top dead center. Instead, the segregation of the combustion chamber allows the piston to cause auto-ignition only in the primary chamber, which has a higher compression ratio and/or pressure ratio than the secondary chamber. The relatively small volume of the primary combustion chamber reduces the downward force on the piston, reducing the risk of damage to the engine even if the piston is in its upstroke. The remaining combustion does not occur until the piston is in its down stroke and the seal/barrier (created by the piston and head shape) between the primary and secondary combustion chamber is removed.

Despite the benefits provided by the multi-phase combustion process, the apparatus and method of Roberts Jr. suffer from several drawbacks. For example, the design of the piston central recess 141, and circumferential recess 134 of the head, create trap volume areas in which it is difficult to obtain a homogeneous air-fuel mixture (as used hereafter meaning exhaust, Exhaust Gas Recirculation (EGR), intake air and fuel are all mixed in a homogeneous fashion). This can significantly reduce the performance and efficiency of the engine. In addition, the central recess 141 of the piston lowers the position of the wrist-pin connecting the piston to the rod. Such a design increases likelihood of engine failure due to decreased control of piston cradle rock/piston slap as well as reduced strength at an area of significant stress on the piston. Moreover, the physical seals that are created between the primary and secondary (tertiary, on so on) combustion chambers, compound the difficulty in creating a homogenous air-fuel mixture, making it difficult to control engine knock. Therefore, it would be beneficial to provide systems and methods for achieving multi-phase compression ignition that reduce trap volume, reducing engine knock, and/or decrease likelihood of engine failure, to have control over compression ignition at a multitude of ranges of RPM's, temperatures and/or multiple loads (with and without boost—e.g. supercharge, turbo, etc.).

In addition, the use of compression ignition in "Siamese cylinder" engines has been difficult or impossible to control. "Siamese cylinder" engines are multi-cylinder engines in which the engine cylinders are arranged in such a way that they do not have channels in the cylinder walls between adjacent cylinders for water or other coolant to circulate. Such arrangements are typically used when it is desirable to have an engine block of limited size or when the stability of the cylinder bores is of concern (such as in racing engines). The lack of coolant results in hot spots at the locations in which adjacent cylinders intersect with one another, which makes control of compression ignition difficult. Therefore, it would be beneficial to provide apparatuses, systems and methods for achieving and/or controlling compression ignition (including spark-assisted and/or fuel-assisted compression ignition) in a "Siamese cylinder" internal combustion engine.

SUMMARY OF THE INVENTION

The present inventive concept comprises apparatuses, systems and methods for achieving multi-phase compression ignition in a manner similar to that described in Roberts, Jr., while also reducing/minimizing/eliminating trap volume, reducing carbon buildup, reducing engine knock, and/or decreasing likelihood of engine failure that is inherent in Roberts, Jr.'s designs, and providing control over compression ignition at a multitude of ranges of RPM's, temperatures and/or multiple loads (with and without boosting of intake charge of any kind). The inventive concept includes a stepped piston that includes a generally central protuberance (or multiple protuberances) that mates with a central recess (or recesses) in the cylinder head to physically segregate the combustion chamber of the engine into multiple smaller chambers (e.g. a primary chamber and at least a secondary chamber, as well as possibly a tertiary, or more subsequent chambers). In some embodiments, although the stepped piston physically segregates the combustion chamber into multiple chambers, the separate chambers are not physically sealed off from one another, allowing fluid communication there between. In some such embodiments, the fluid communication between combustion chambers is controlled through a multiphasic dynamic compression ignition combustion process in which there is constant fluid communication between the primary and secondary (as well as tertiary and so forth) combustion chambers/ignition sources. In such embodiments, the multiphasic dynamic process aids in creating a homogenous air-fuel mixture and slows down ignition to allow the piston to move past top dead center before full ignition occurs (e.g. throughout the entire combustion chamber including primary, secondary, etc.).

It will be appreciated that various embodiments of the instant inventive concept will be utilized in connection with any type of compression ignition engine technology now known or hereafter discovered, including, but not limited to, Diesel/Stratified Charge Compression Ignition, Homogeneous Charge Compression Ignition, Homogenous Compression Ignition (HCI), Homogeneous Charge with Spark Ignition, Gas Direct Compression Ignition, diesel and other fuels, as well as fuel blends (including liquid fuels, solid fuels, natural fuels, or other fuels now known or hereafter developed or discovered), carbureted and/or injected as different types of fuel and fuel blend compression ignition, spark-assisted ignition, fuel-assisted ignition, and the like. In some embodiments fuel is introduced (e.g. direct injection, or other form of fuel intake) separately into different parts of the combustion chamber, such as separately into primary and secondary chambers. In some such embodiments, different types of fuel are introduced into one or more separate parts of the combustion chamber (e.g. diesel fuel in primary and gas in secondary, etc.). Embodiments of the instant inventive concept include both two cycle and four cycle technologies, Miller cycle, Atkinson cycle, rotary engine, modified piston engines (e.g. offset elliptical pistons or other convoluted shapes of pistons), turbine fans, opposed piston, Scuderi or other split cycle engines, and other engine technologies now known or hereinafter developed. In some two cycle embodiments, intake and exhaust valves are included in the head. In other embodiments, the exhaust is located on the side and the piston acts as the exhaust valve to control exhaust. In some preferred embodiments, at least one intake valve is located in the head to help minimize trap volume. In some embodiments, a butterfly (or other suitable valve assembly) is included within the exhaust. In such embodiments, the valve is utilized to trap heat and/or exhaust gas inside the combustion chamber to suffocate (or partially suffocate) the next combustion cycle and assist with compression ignition in the engine. In some such embodiments, the trapped heat functions as a catalyst for the next combustion cycle. It will be appreciated that in various embodiments the butterfly exhaust valve will be opened or closed or adjusted at any given time to control the compression ignition process. In some embodiments, the butterfly valve is opened further at higher RPM's and closed more at lower RPM's. It will be appreciated that the butterfly exhaust valve of the inventive concept will be utilized with any of the engine embodiments herein (such as the multiphasic dynamic compression ignition combustion engines disclosed herein), alone or in combination with other features, as well as in connection with other two cycle, four cycle or other engine types of the prior art and hereinafter discovered (such as engines that do not utilize multiphasic dynamic compression ignition combustion).

Although not shown, various embodiments of the inventive concept include fuel injectors located at various locations about the combustion chamber to provide the desired homogenous air/fuel/EGR mixture throughout the chamber. In some embodiments injectors are located at varying angles and orientations, including at varying crank angles and/or at multiple different crank angles within a single cycle, to provide desired mixtures of fuel/air into the combustion chamber. In some embodiments, no fuel is injected directly into the combustion chamber, instead the fuel is mixed into the air in a pre-intake area (e.g. prior to entering the combustion chamber through the intake valve(s)). In various embodiments, the air-fuel mixture is accomplished via high or low pressure port, throttle body (including upstream linear EGR connected into throttle body, and/or downstream fuel injection to assist in better atomization of air/fuel and/or EGR blending), sequential, assisted port, direct or indirect injections, or any combination thereof. In still other embodiments, carburetor(s) is/are used to accomplish the air-fuel mixture, or a portion thereof. In some embodiments, a stratified cloud injection for throttle body is utilized, in which a fuel pressure of 90 PSI or higher is created through electric or mechanical pumps to create a fine mist with high atomization capability. In other low pressure injection embodiments, a fuel pressure of 10 PSI or higher is utilized. Some embodiments include single, twin, triple, quads, etc. throttle high pressure cloud throttle body. The high pressure atomizes the fuel to result in improved homogenous fuel-mix for HCCI. In some embodiments, the inventive concept utilizes high pressure fuel injection via a multitude of nozzles to create the cloud injection.

In some embodiments standard throttle control is utilized to control the intake gases of the engine. In some embodiments, a butterfly throttle control is utilized to restrict intake gases. In some embodiments throttle body with a butterfly assembly and/or carburetor with adjustable lean/rich control function to control the amount of air/fuel entering the engine intake is utilized. In some embodiments, an electronic control is utilized in connection with the enrichment needle to control the lean/rich function and control the amount of fuel in the intake at any given time. In some embodiments, the electronic control of the lean/rich function is part of a carburetor. In some embodiments, a carburetor includes throttle control of intake gases.

In some embodiments, spark plugs 505*a* or glow plugs 505*b* are utilized to aid in ignition. For example, in some embodiments, spark plugs are utilized in low temperature, low RPM or engine startup situations. The angle and location of the spark plug(s) varies based on desired performance of the engine. In some embodiments, the spark plug(s) is positioned at a 45 degree angle to the piston to prevent interference with intake valves. In some embodiments, spark plugs are located in the primary chamber. In some embodiments, spark plugs are located in the secondary chamber (tertiary, etc.). In some embodiments, spark plugs are located in both primary and secondary chambers. In various embodiments of the preset invention, one or more spark plug and/or glow plug extends through a wall of the head into one or more chamber. In some embodiments, one or more spark plug and glow plug extends into a single compression chamber (Ref. FIG. 60).

Some embodiments of the present inventive concept comprise apparatuses, systems and methods for achieving multi-phase compression ignition in a "Siamese cylinder" internal combustion engine in a manner similar to that described above. In some embodiments, the inventive concept includes a stepped piston that includes a generally central protuberance that mates with a central recess in the cylinder head to physically segregate the combustion chamber of the engine into multiple smaller chambers (e.g. a primary chamber and at least a secondary chamber, as well as possibly a tertiary, or more subsequent chambers). In some embodiments, although the stepped piston physically segregates the combustion chamber into multiple chambers, the separate chambers are not physically sealed off from one another, allowing fluid communication there between. In some such embodiments, the fluid communication between combustion chambers is controlled through a multiphasic dynamic compression ignition combustion process in which there is constant fluid communication between the primary and secondary (as well as tertiary and so forth) combustion chambers/ignition sources. In such embodiments, the multiphasic dynamic process aids in creating a homogenous air-fuel mixture and slows down ignition to allow the piston to move past top dead center before full ignition occurs (e.g. throughout the entire combustion chamber including primary, secondary, etc.).

The foregoing and other objects are intended to be illustrative of the inventive concept and are not meant in a limiting sense. Many possible embodiments of the inventive concept may be made and will be readily evident upon a study of the following specification and accompanying drawings comprising a part thereof. Various features and subcombinations of inventive concept may be employed without reference to other features and subcombinations. Other objects and advantages of this inventive concept will become apparent from the following description taken in connection with the accompanying drawings, wherein is set forth by way of illustration and example, an embodiment of this inventive concept and various features thereof.

BRIEF DESCRIPTION OF THE DRAWINGS

A preferred embodiment of the inventive concept, illustrative of the best mode in which the applicant has contemplated applying the principles, is set forth in the following description and is shown in the drawings.

In FIG. 9, the piston is positioned such that the combustion chamber is not segregated. In other words, the primary and secondary (and any subsequent) combustion chambers are all in complete fluid communication with each other.

In FIG. 13, the piston is positioned such that the combustion chamber is not segregated. In other words, the primary and secondary (and any subsequent) combustion chambers are all in complete fluid communication with each other. Furthermore, in FIG. 13, ports are included in the piston to provide for multiphasic dynamic compression ignition combustion. In addition, ports are included in the head to aid in creating a homogenous air-fuel mixture by creating spin within the combustion chamber(s) before, after and/or at auto-ignition.

FIGS. 18A, 18B, and 18C show representative cross-sectional plan views of a multi-staged injector of an embodiment of the inventive concept.

DETAILED DESCRIPTION OF A PREFERRED EMBODIMENT

Figure 1:
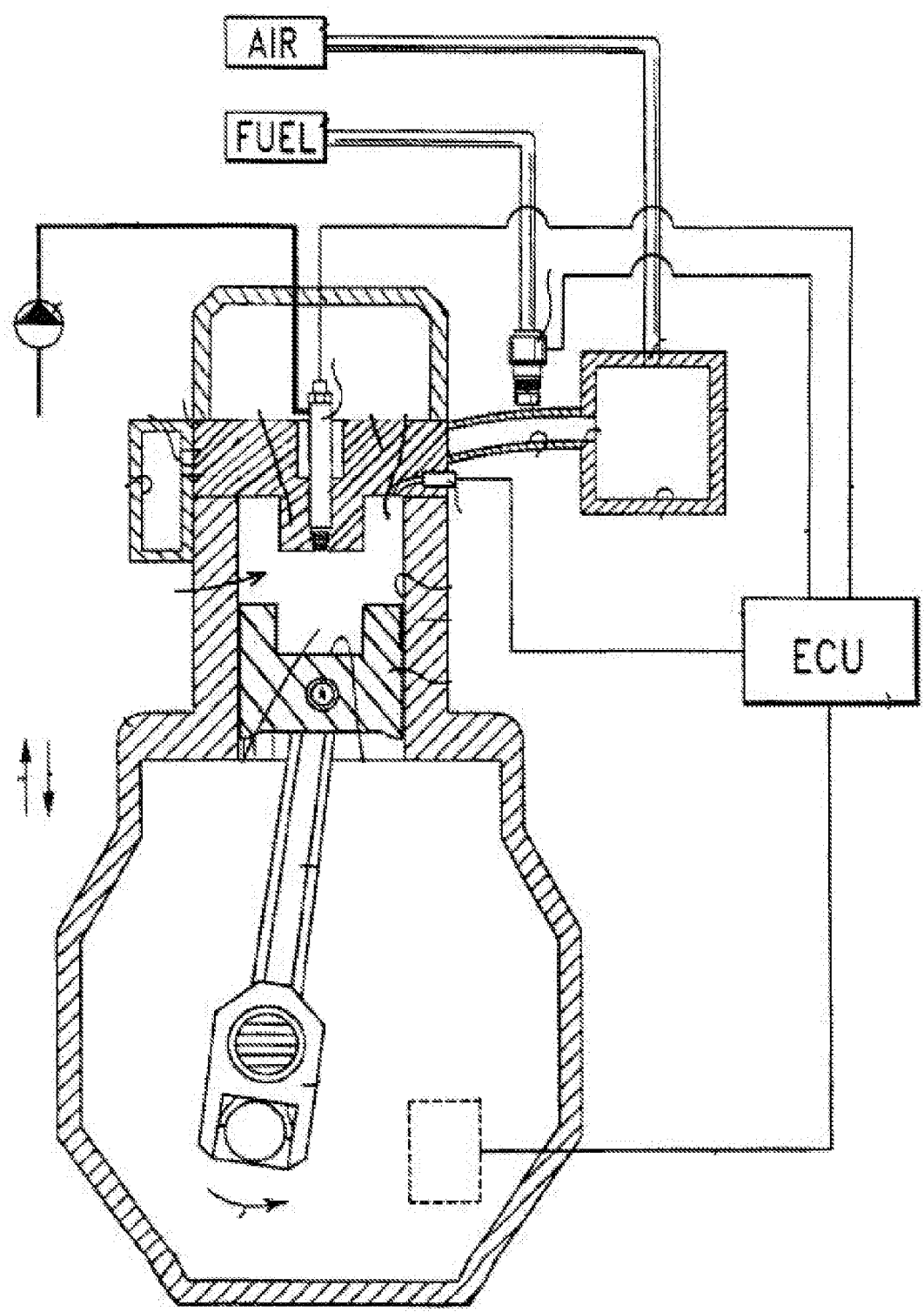
FIG. 1 shows a cross-sectional view of a multi-zone combustion chamber compression ignition engine of the prior art.
Figure 2:
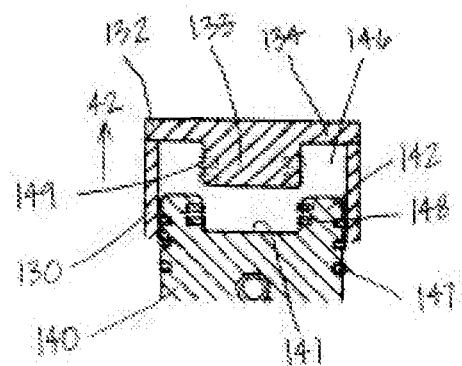
FIGS. 2-8 illustrate the multiple phases of combustion in the prior art engine of FIG. 1.
Figure 3:
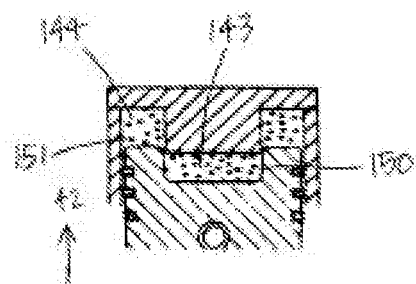
Figure 4:
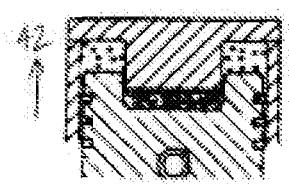
Figure 5:
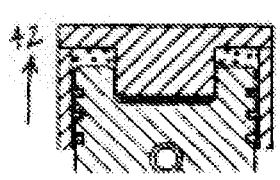
Figure 6:
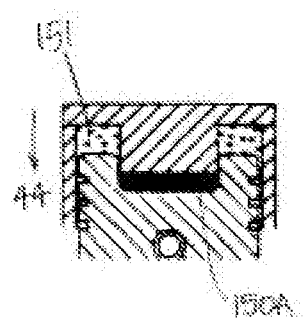
Figure 7:
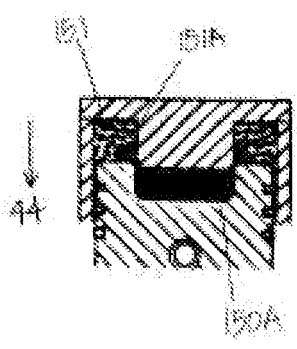
Figure 8:
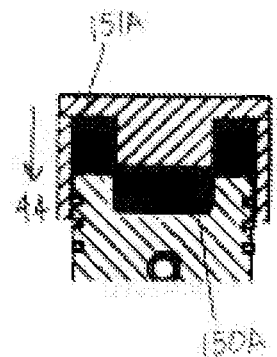

As required, detailed embodiments of the present inventive concept are disclosed herein; however, it is to be understood that the disclosed embodiments are merely exemplary of the principles of the inventive concept, which may be embodied in various forms. Therefore, specific structural and functional details disclosed herein are not to be interpreted as limiting, but merely as a basis for the claims and as a representative basis for teaching one skilled in the art to variously employ the present inventive concept in virtually any appropriately detailed structure.

Referring to FIGS. 9 through 12, an exemplary embodiment of the inventive concept includes a piston 100 that is configured to reciprocate axially within a bore of a cylinder 300 such that the piston is moveable between a top position and a bottom position. A head 500 is coupled to a top of the cylinder such that a top surface of the piston is in close proximity to a bottom surface of the head when the piston is in the top position. In some embodiments, the bottom surface of the head and the top surface of the piston are configured to define a specific volume of one or more voids positioned between the piston and the head when the piston is in the top position.

In some embodiments, a generally central protuberance 110 extends from the top of the main body of the piston such that the top surface of the piston is defined partially by a top surface of the main body of the piston and partially by a top surface of the protuberance. In some such embodiments, the cylinder head 500 includes a generally central recess 510 that is configured to matingly receive the protuberance 110 of the piston when the protuberance is in an engaged configuration. The central protuberance 110 of the piston is adapted to be slidingly received in the central recess 510 of the head as it moves between an initial engagement configuration and a full engagement configuration, the full engagement configuration of the protuberance coinciding with the top position of the piston. As the piston moves from the bottom position toward the top position, often referred to as top dead center, the central protuberance 110 of the piston moves from a disengaged configuration to the initial engaged configuration, which coincides with the protuberance of the piston being first received by the recess of the head. As the piston continues to move towards the top position, the protuberance slides into the central recess 510 of the head, creating a primary combustion chamber 600 and a secondary combustion chamber 700. The primary combustion chamber 600 is defined by the void between a top surface of the protuberance and a top surface of the recess. The secondary combustion chamber 700 is defined by one or more void between a top surface of the main body of the piston and a bottom surface of the head.

In some embodiments, the respective volumes of primary combustion chamber 600 and secondary combustion chamber 700 are designed such that the compression ratio and/or pressure ratio of primary combustion chamber 600 is higher than that of secondary combustion chamber 700 (in other embodiments, the reverse is true). In that manner, auto-ignition of a fuel-air mixture can be obtained in the primary combustion chamber 600 either before, at, or after the piston reaches top dead center, without resulting in auto-ignition within the secondary combustion chamber 700. As the piston moves away from the top position, the protuberance 110 moves from the engaged configuration towards the disengaged configuration in which the protuberance is displaced from the recess 510 of the head, allowing the pressure created by the combustion within the primary combustion chamber 600 to expand into the secondary combustion chamber 700, initiating combustion, combustion ignition and/or ignition within the secondary combustion chamber 700.

Figure 10:
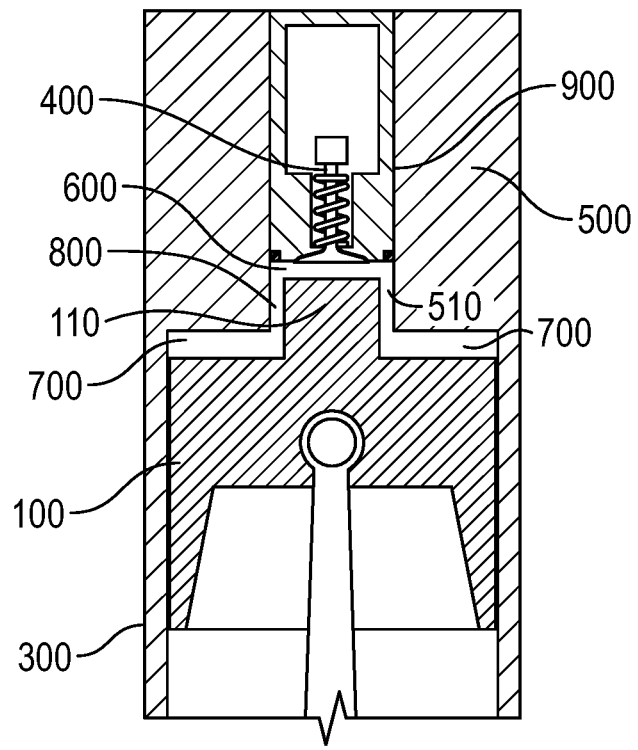
FIG. 10 shows a cross-sectional view of the engine of FIG. 9, with the piston positioned such that the combustion chamber is segregated into a primary combustion chamber and a secondary combustion chamber.
Figure 11:
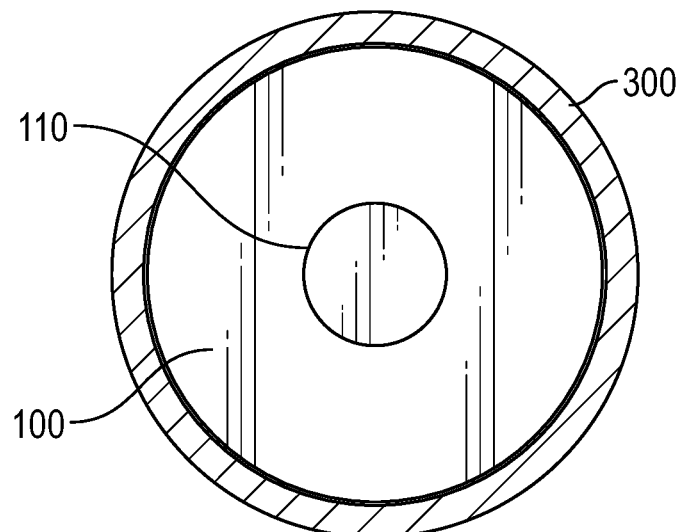
FIG. 11 is a top cross-sectional plan view of the piston of FIGS. 9 and 10 taken along section line 11-11 of FIG. 9.
Figure 12:
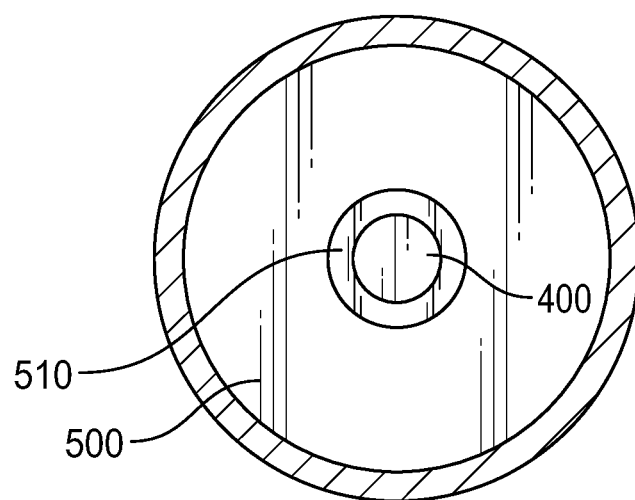
FIG. 12 is a bottom cross-sectional plan view of the head of FIGS. 9 and 10 taken along section line 12-12 of FIG. 9.
Figure 13:
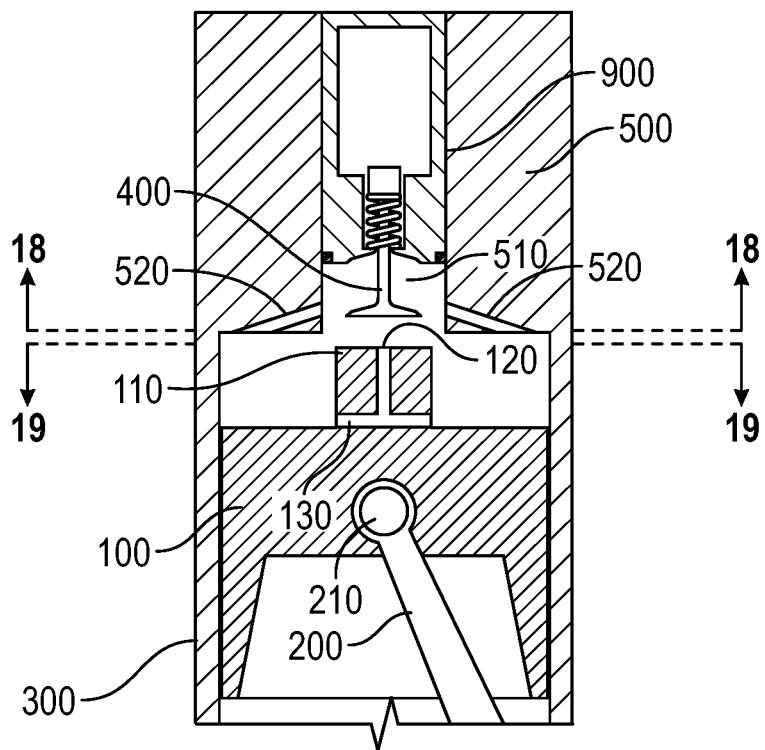
FIG. 13 shows a cross-sectional view of a multi-zone combustion chamber compression ignition engine of another embodiment of the instant inventive concept.

Referring to FIG. 10, some embodiments define a gap 800 between an outer circumference of the protuberance 110 and an inner wall of the recess 510 when the protuberance is in the engaged configuration. In some such embodiments, one or more gap-filling mechanism, such as rings, is coupled to the protuberance 110 and/or secured within the recess 510 so as to prevent or otherwise inhibit fluid from flowing from through the gap 800. In some such embodiments, the gap filling mechanism creates an air-tight seal between the primary combustion chamber 600 and the secondary combustion chamber 700 when the protuberance is in the engaged configuration. In other embodiments, however, gap filling mechanisms, such as rings (or another seal), are not utilized, as the size of gap 800 is designed to allow sufficient pressure to be created within primary combustion chamber 600 to create auto-ignition, without permitting sufficient pressure to escape through gap 800 to create ignition within secondary combustion chamber 700 while the piston is at the top position, prior to the piston being in its down stroke. In still some embodiments, as discussed below, the primary and secondary combustion chambers remain in constant fluidic communication with one another for the purposes of creating multiphasic dynamic compression ignition combustion. In some embodiments, gap 800 is sufficient to provide such constant fluidic communication between the primary and secondary combustion chambers at all times during the piston stroke.

Figure 9:
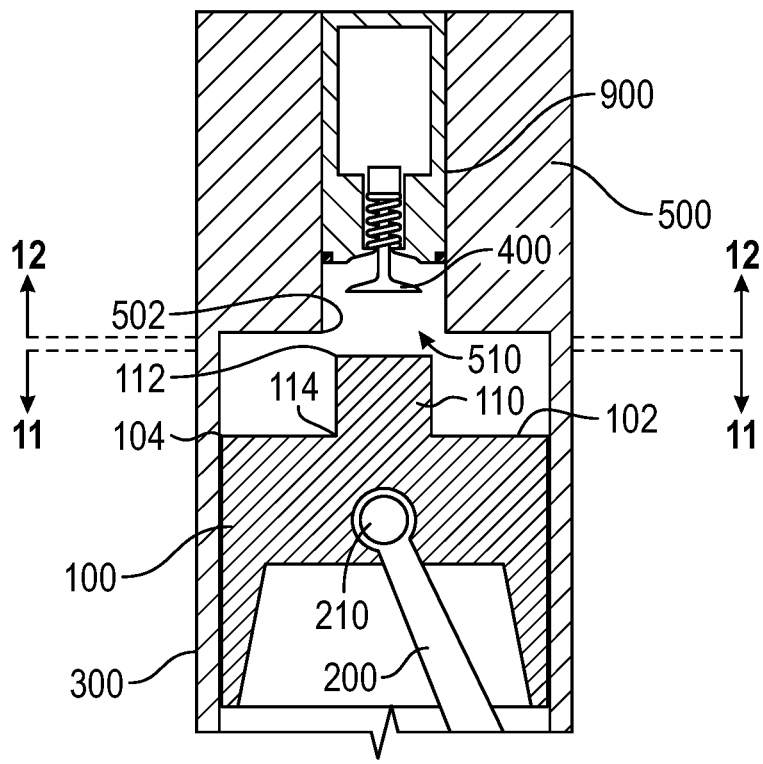
FIG. 9 shows a cross-sectional view of a multi-zone combustion chamber compression ignition engine of an embodiment of the instant inventive concept.

As is shown in FIGS. 9 and 10, intake valve 400 is located within recess 510 of the cylinder head to reduce and/or eliminate trap volume (and/or rich air pockets, and/or unbalanced combustion between the primary and secondary chambers) within the combustion chamber, and to ensure a homogenous air/fuel/EGR mix within the entire combustion chamber (primary and secondary chambers). It will be appreciated that in other embodiments, additional intake valves are included at other locations in which trap volume would otherwise exist and/or in which air/fuel/EGR mix is desired (such as in the secondary combustion chamber). For example in embodiments with tertiary or more combustion chambers, intake valves are included in each combustion chamber. It will further be appreciated that in some embodiments the intake valve 400 (and/or other intake valves) are opened during at least a portion of the exhaust stroke (and/or in some embodiments, during at least a portion of the power and/or compression strokes), to eliminate trap volume. In some such embodiments the valve is opened at the top of the exhaust stroke. In some embodiments, exhaust valves, not shown, are located within the secondary combustion chamber. Still in further embodiments, exhaust valves (not shown) are included in the recess 510 to help eliminate trap volume, and/or at other desired locations within the combustion chamber. It will be appreciated that by eliminating trap volume, the inventive concept helps to create equal air/fuel and exhaust EGR, hydrocarbons, carbon monoxide and maintain low NOx emissions. The inventive concept allows for 2 cycle scavenging that is not present in the prior art such as Roberts Jr. discussed above.

Referring to FIGS. 9 and 10, the design of the piston 100, with the protuberance 110 located at the center of piston 100, allows a wrist-pin 210 to attach a rod 200 to the piston at a location of increased thickness of the piston (due to the protuberance). This increases strength at a location that otherwise is under increased stress. In addition, the relatively high connection on the piston allows for greater control of the piston and decreased piston slap as the piston moves up and down within the cylinder.

Referring to FIGS. 13 through 16, some embodiments include one or more head port 520 defined by and extending through a portion of the head 500. In some such embodiments, each head port 520 extends between the primary 600 and secondary 700 combustion chambers when the protuberance is in the initial engagement configuration. In some embodiments, the ports are designed to create a circulatory or spinning, and/or roll and/or tumble, airflow into the combustion chamber(s) as the piston 100 reciprocates within the cylinder to create a constant mixture of air/fuel. This helps to eliminate or otherwise minimize trap volume within the combustion chamber. In some embodiments, as is shown in FIGS. 13 through 16, the protuberance 110 operates as a valve to close the head ports when the protuberance is in the fully engaged configuration. In some such embodiments, the head ports reopen as the protuberance moves away from the fully engaged configuration. In other embodiments, openings of the head ports are positioned within the recess such that primary chamber 600 remains in continuous fluidic communication with the secondary chamber 700 through at least some of the head ports 520 regardless of the position of the protuberance. In some embodiments, as shown in FIGS. 13 through 16, ports 520 are shown at roughly 45 degree angles from top to bottom. It will be appreciated that other angles, sizes, shapes, lengths, etc. of ports 520 will be utilized in various embodiments to create the desired circulation within/between the combustion chambers. Moreover, the number and positions of the ports 520, and exit/entrance angles will vary between embodiments to obtain the desired circulation. In some embodiments, gap 800 is sufficient to provide for constant fluidic communication between the primary chamber 600 and secondary chamber 700 at all times during the piston stroke.

In some embodiments, as shown in FIGS. 13 through 16, the protuberance defines one or more ports 130 extending from a top surface of the protuberance to a side surface of the protuberance. In some such embodiments, a single central port 120 extends axially into the protuberance from a center of the top surface of the protuberance and a plurality of lateral ports extend from the central port to a side surface of the protuberance. In some such embodiments, each lateral port extends at an angle relative to the central port such that the length of any pathway through the central port and any one of the lateral ports is the substantially the same distance as the length of a pathway through the central port and any one of the other lateral ports.

Figure 14:
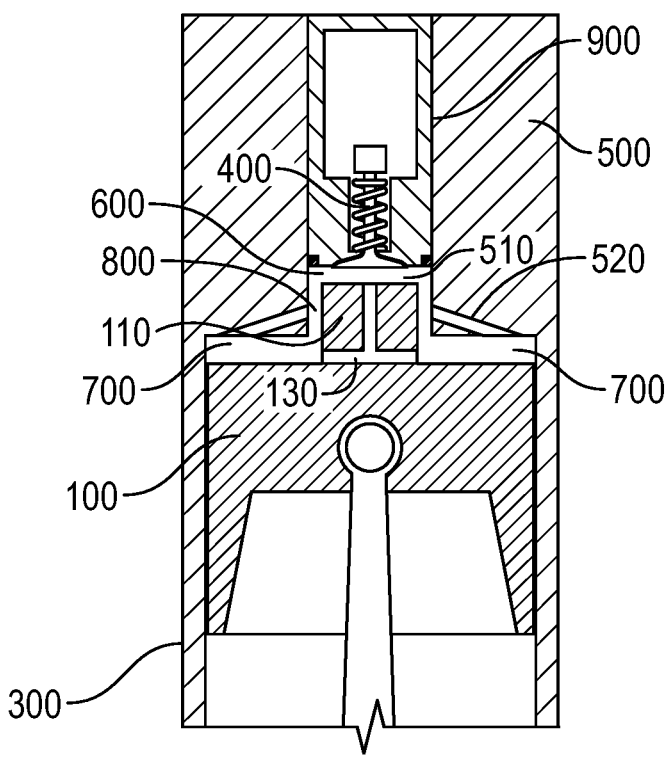
FIG. 14 shows a cross-sectional view of the engine of FIG. 13, with the piston positioned such that the combustion chamber is segregated into a primary combustion chamber and a secondary combustion chamber. As is shown in FIG. 14, even when the combustion chambers are segregated, they are not sealed off from each other.
Figure 15:
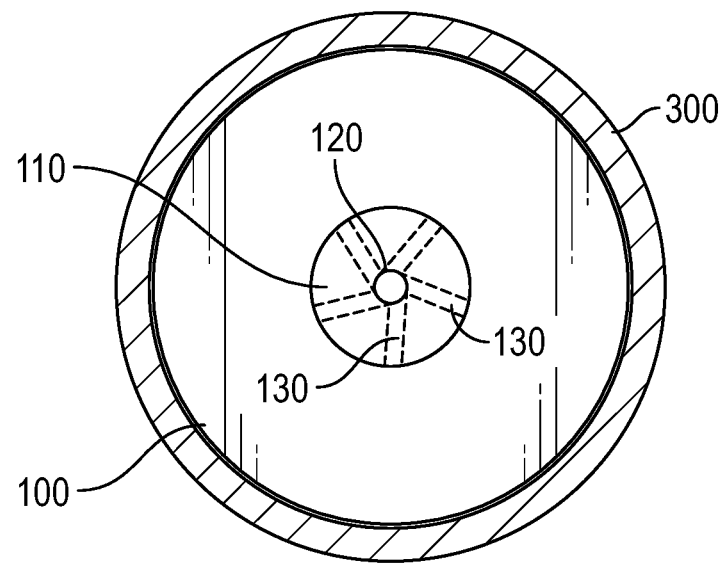
FIG. 15 is a top cross-sectional plan view of the piston of FIGS. 13 and 14 taken along section line 19-19 of FIG. 13.
Figure 16:
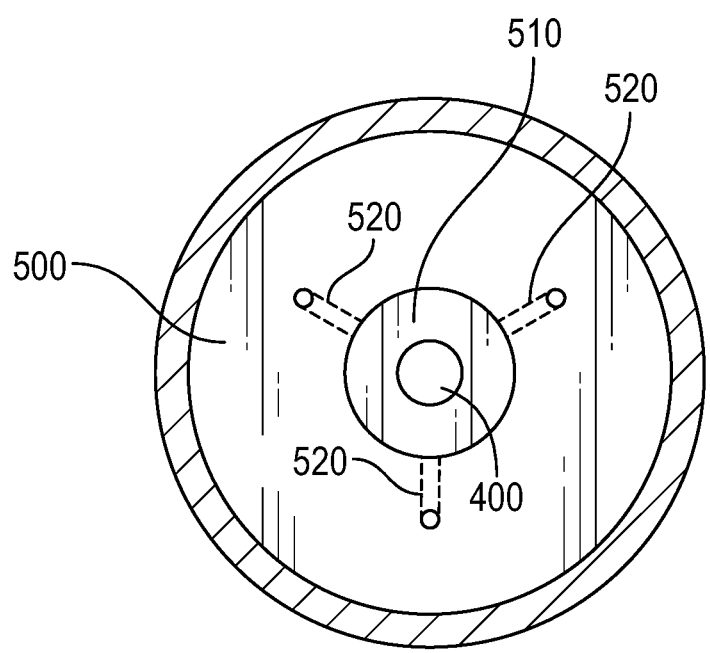
FIG. 16 is a bottom cross-sectional plan view of the head of FIGS. 13 and 14 taken along section line 18-18 of FIG. 13.

In some embodiments, as shown in FIG. 14, an opening for at least some of the lateral ports is positioned along the outer surface of the protuberance such that the lateral port is in fluid communication with the secondary combustion chamber 700 when the protuberance is in an engaged configuration, regardless of whether the protuberance is in the initial engaged configuration or the fully engaged configuration. In this manner, it is possible to maintain constant and continuous fluidic communication between the primary 600 and secondary 700 combustion chambers, aiding in multiphasic dynamic compression ignition combustion. In some embodiments, the ports are designed to create a circulatory or spinning airflow into the combustion chamber(s) as the piston 100 reciprocates within the cylinder. This helps to eliminate or otherwise minimize trap volume within the combustion chamber. In some embodiments, as shown in FIGS. 13 through 16, ports 120, 130 are shown at various angles from top to bottom and around the protuberance 110. It will be appreciated that other angles, sizes, shapes, lengths, etc. of ports 120, 130 will be utilized in various embodiments to create the desired circulation within/between the combustion chambers. Moreover, the number and positions of the ports 120 and 130, and exit/entrance angles will vary between embodiments to obtain the desired circulation. In some embodiments, as shown in FIG. 15, ports 130 come off port 120 generally tangentially, so as to help create a circulatory flow within the combustion chamber.

Figure 17:
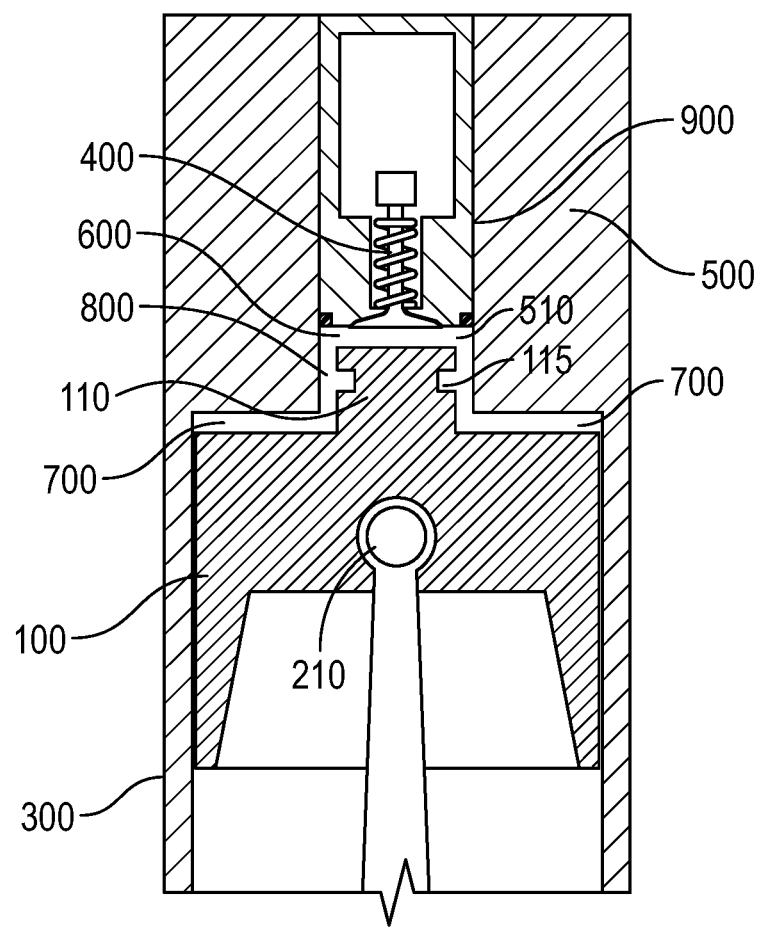
FIG. 17 shows a cross-sectional view of an alternate embodiment of the engine of FIGS. 9 and 10, with the piston positioned such that the combustion chamber is segregated into a primary combustion chamber and a secondary combustion chamber.

Referring to FIG. 17 a cross-sectional view of an alternate embodiment of the engine of FIGS. 9 and 10 is shown with the piston positioned such that the combustion chamber is segregated into a primary combustion chamber and a secondary combustion chamber. In the embodiment shown in FIG. 17, the protuberance 110 of the piston 100 includes a groove 115 around the circumference of protuberance 110. It will be appreciated that similar grooves and/or indentations are included in various embodiments of the invention similar to those discussed herein, including but not limited to the various embodiments shown with respect to FIGS. 1 through 16 above. In some embodiments multiple groves/indentations are utilized. The grooves/indentations create friction to help created a velocity vortex/turbulence within the combustion chamber(s).

In some embodiments, initial ignition occurs in the primary chamber 600 prior to secondary ignition occurring in the secondary chamber 700. It will be appreciated that in other embodiments initial ignition occurs in the secondary chamber 700 and secondary ignition occurs in the primary chamber 600. In such embodiments the piston 100, the protuberance 110, the head 500, and the central recess 510 are configured such that a higher compression ratio and/or pressure ratio is obtained in the secondary chamber 700 than in primary chamber 600.

In some embodiments, a housing for valve 400, and or another suitable structure is positioned within the recess 510 and is configured to vary the volume within the recess 510. In this way, the housing of valve 400 is capable of adjusting the compression ratio within the primary combustion chamber 600 to allow for varying level of performance and/or to accommodate various operating conditions. In some embodiments a piston arrangement similar to that shown in US Published Patent Application No. 2007/084428, the entire disclosure of which is incorporated herein by reference, is utilized to vary the volume within the recess 510. Referring to FIGS. 9 and 10, an exemplary variable compression ratio piston 900 houses valve 400, such that piston 900 is moveable between an open position and a closed position, thereby allowing the variable compression ratio piston 900 to vary the volume within the recess 510. In some embodiments, a variable compression ratio piston is hydraulic (a "Hydraulic Variable Compression-ratio Piston"), while in other embodiments the piston displacement is electro mechanical hydraulic, piezo-electro mechanical hydraulic, or any other form of displacement now known or hereafter developed. In some embodiments, the variable compression ratio piston is moved via an electric motor and screw gear assembly. In some such embodiments, the screw gear assembly adjusts the variable compression ratio piston up and down as engine RPM's go up and down. In some embodiments, the screw gear assembly is utilized for generally "slower" adjustments of the variable compression ratio piston, in which the variable compression ratio piston is maintained at a constant location for multiple strokes of the piston such that the variable compression ratio piston is not displaced to a different ratio each stroke. In some embodiments, the variable compression ratio piston is moved up and down via a connecting rod and cam assembly. Some such embodiments allow for much "faster" displacement of the variable compression ratio piston, thereby allowing for the variable compression ratio piston to be displaced to a different ratio each stroke. In some such embodiments, the variable compression ratio piston reciprocates every combustion cycle opposing or otherwise countering the reciprocating motion of the protuberance(s) of piston 100 of the inventive concept. Some such embodiments allow for maximum combustion in the primary combustion chamber, thereby generating energy to the crank through the valve train while allowing for precombustion.

It will be appreciated that in some embodiments, the variable compression ratio piston of the inventive concept is a separate structure from any valve, such that the variable compression ratio piston's sole function is to vary the volume within recess 510. In some embodiments, the variable compression-ratio piston includes an intake valve within or as part of the piston, such that the valve is displaced with the piston. In other embodiments, the valve is separate from the piston, such that the valve remains in a static location while the piston is displaced.

Referring to FIGS. 58 through 61, some embodiments of the variable compression ratio piston 900 is moveable between first and second positions associated with maximum and minimum recess 510 volumes, respectively. In some embodiments, a linkage assembly 910 is utilized to move the variable compression ratio piston between its first and second positions and/or to selectively secure the variable compression ratio piston in its first position, in its second position, and/or in one or more intermediate position.

In some embodiments, the present invention includes a control system for monitoring and/or controlling the position of the variable compression ratio piston 900. In some embodiments, the control system utilizes a mechanical method and/or an electrical method, such as a reluctor and/or hall effect method, for determining the position of the variable compression ratio piston. In some embodiments, the control system includes first 922 and second 924 sensors for sensing when the variable compression ratio piston is in its respective first or second position. In some such embodiments, the control system further includes a plurality of intermediate sensors positioned between the first and second sensors, each being associated with a respective intermediate position of the variable compression ratio piston.

In some embodiments, the variable compression ratio piston includes one or more feature associated with a respective sensor. In some embodiments, a plurality of corresponding features of the variable compression ratio piston are positioned such that each feature moves in and out of a corresponding sensor's line of sight (and/or otherwise moves relative to a sensor's sensing area) as the variable compression ratio piston is moved between its first and second position. In this way, first 912, second 914, and intermediate features are positioned so as to only be sensed by respective first 922, second 924, and intermediate sensors when the variable compression ratio piston 900 is in respective first, second, and intermediate positions, thereby providing an indication of the current position of the variable compression ratio piston. In some embodiments, one or more sensor is held in position by a sensor support member 920.

In some embodiments, a plurality of sensors are spaced-apart along a first plain and a plurality of corresponding features are spaced apart such that each corresponding feature is aligned with a corresponding sensor and positioned on a unique corresponding parallel plain, each plain being perpendicular to a direction of motion of the variable compression ratio piston such that only one feature is sensed by a sensor at a time. In this way, the control system is capable of determining a current position of the variable compression ratio piston and/or is capable of moving the variable compression ratio piston to a desired position.

In some embodiments, the present invention further includes one or means of measuring ambient air pressure and/or for adjusting operation of the engine to accommodate different altitudes, such as an altitude dial. In some embodiments, the means of adjusting operation of the engine includes changing air flow and/or fuel flow to accommodate different air qualities and/or mixture requirements.

Still referring to FIGS. 58-61, some embodiments of the present invention include one or more insert 930 for receiving, storing, and/or providing heat energy. In some embodiments, the insert 930 is made from one or more material having superior heat transfer properties, such as brass, copper, titanium, aluminum, or the like. In some embodiments, one or more insert 930 is at least partially embedded into the head 500, the protuberance 110, and/or the variable compression ratio piston 900 such that the insert 930 is in thermal communication with fluid within the recess 510 immediately before combustion and immediately after combustion, thereby resulting in thermal energy from the insert 930 moving into the fluid prior to combustion and thermal energy from the fluid moving into the insert 930 after combustion. In this way, regulating the size, shape, location, and material of one or more insert 930 allows a user to influence how much thermal energy from a first combustion cycle can be stored for promoting one or more future combustion cycle. It will be appreciated that in various embodiments, the number and location of insert 930 will vary. In some embodiments insert 930 is located in the head and/or piston of embodiments that do not include a variable compression ratio piston. In some embodiments, the insert 930 is a screw inserted into the head, piston and/or variable compression ratio piston. In some embodiments, the insert 930 is a rivet projecting through the piston. In some embodiments, the insert 930 is a washer or disc located within the head. It will be a appreciated that other shapes and mounting mechanisms for insert 930 are included in various embodiments of the inventive concept.

In some embodiments, the top surface of the protuberance 110 defines a concave shape. In some such embodiments, a top surface of the recess 510 defines a corresponding convex shape. In other embodiments, the top surface of the protuberance 110 defines a convex shape. In some such embodiments, a top surface of the recess 510 defines a corresponding concave shape In some embodiments a top surface of the main body of the piston 100 defines a convex shape while, in other embodiments, the top surface of the main body of the piston 100 defines a concave shape. In some such embodiments, a bottom surface of the head 500 defines a concave shape that is configured to correspond with a convex shape of the top surface of the main body of the piston. In other such embodiments, the bottom surface of the head 500 defines a convex shape that is configured to correspond with a concave shape of the top surface of the main body of the piston. It will be appreciated that various embodiments of the inventive concept include all variation permutations of concave and convex shapes combined with each other along with generally flat surfaces in combinations with the concave and convex surfaces discussed above. In still further embodiments, non-curved shapes are utilized. For example, in some embodiments the protuberance includes a triangular or pyramidal shaped protrusion that engages an opposing triangular or pyramidal shaped recess. In other embodiments, a square or rectangular shaped nipple and recess is utilized. In some embodiments protuberance 110 includes a tapered shape such that width narrows from the top of protuberance 110 down to a narrower width toward bottom of protuberance 110, at the point in which it intersects with the remainder of piston 100. Such a tapered shape helps to reduce or prevent carbon buildup caused by interference with the cylinder head.

In some embodiments, various edges of the piston and/or head are filleted, chamfered or otherwise curved, to cause air to move and create a "donut" affect from blow-by of the primary piston and/or to help roll and tumble within the combustion chamber. For example, location 114 in FIG. 9 in some embodiments is filleted. In some embodiments, edge 104 is filleted. In some embodiments, edge 112 is filleted. In some embodiments edge 502 of head is filleted. In some embodiments, top surface 102 of piston 100, surrounding protuberance 110 is concave in shape, e.g. to form a cup. In other embodiments, surface 102 is convex in shape.

It will be appreciated that the dimensions and shape of various protuberances 110 and corresponding central recesses 510 will vary in embodiments of the invention to provide the desired compression and/or pressure ratios and performance. In some embodiments in which multiple protuberances are utilized, the sizes and shapes vary to create different combustion chambers, e.g. primary, secondary, tertiary, etc. In such embodiments, the volumes will vary to provide for different compression and/or pressure ratios. In some embodiments, multiple protuberances will have different dimensions, but will have equal volumes to provide for equivalent compression and/or pressure ratios. In some embodiments, the central protuberance creates a primary combustion chamber, while other protuberances surrounding the central protuberance creating secondary (or tertiary, etc.) combustion chambers, and with the reminder of the combustion chamber (e.g. chamber 700) being a tertiary (or subsequent) combustion chamber. In other embodiments, one or more protuberances surrounding the central protuberance will be the primary combustion chamber. It will further be appreciated that the bore and stroke, and other engine design parameters will vary to optimize, reduce or increase the design for different types of fuel.

Some embodiments of the inventive concept include an opposed piston design similar to those discussed above. In some such embodiments there is a single primary piston combined, in some embodiments, with the variable compression ratio piston discussed above that mates with the primary piston all within a single cylinder. In other embodiments, opposing pistons operate within separate opposing cylinders. In some such embodiments, variable compression ratio pistons are also utilized.

Embodiments of the inventive concept produce on demand flame and/or pressure propagation by creating compression ignition in the primary combustion chamber and allowing the combustion to propagate to the secondary chamber as the piston moves away from the head, thereby increasing the volume.

It will be appreciated that embodiments of the multi-phase and multiphasic dynamic compression ignition combustion engines disclosed herein will include varying numbers of cylinders (e.g. 1, 2, 4, 6, 8, etc.), and varying cylinder displacements. In some embodiments of the instant invention, a lower number of cylinders is utilized (e.g. 2 cylinders) to provide the same total engine displacement as what is typically found in higher number of cylinder engines (e.g. 8 cylinders). Because the inventive concept allows for complete compression ignition combustion and/or on demand flame and/or pressure propagation, the bore size of the cylinders can be scaled up and down as desired without any increase in emissions or decrease in efficiencies. In some embodiments, an opposed two cylinder structure is utilized to design a higher displacement (e.g. 4.0 liters, etc.) engine. Such a structure results in smaller overall size of the engine, as well as material and labor saving in manufacturing.

In some embodiments of the inventive concept a heat storage medium is included on the top of the piston, such as on top of the protuberance of the inventive concept, and/or on the cylinder head, such as near the center of the top of the cylinder. In some embodiments, the heat storage medium is designed to retain heat and become hotter than the walls of the cylinder or piston. In some such embodiments, the increased heat of the storage medium then dissipates into the compressed charge to assist with auto-ignition near the storage medium. In some embodiments, the heat storage medium is a relatively small piece of metal or other material having suitable thermodynamic properties to store and release heat to aid in auto-ignition as described. In some embodiments, the heat storage medium is a coating that is applied to a surface of the piston and/or the head.

In some embodiments, a ceramic coating, an anodized coating, or other suitable heat resistant coating or surface feature now known or hereafter discovered, is added to the cylinder head and/or piston surface(s) to improve heat resistance and prevent/minimize torching damage to the aluminum or other material of which the piston/head are constructed.

In some embodiments pre-heaters are included on or in association with an intake manifold to heat up the air/fuel and/or water entering the engine to aid with startup and performance.

In some embodiments (see for example FIGS. 20 through 22) an engine of the inventive concept includes offset intake and exhaust valves positioned around the central valve associated with the central protuberance of the piston and its associated recess. In some such embodiments, the exhaust valves are located on the right and left sides of the engine, and the intake valves are in-line with the crank. In some such embodiments, the exhaust ports extend up from the exhaust valves and out toward the right or left of the respective exhaust valves. The offset location of the exhaust valves to the intake valves allows for balanced temperature within the combustion chamber. The location of the valves in some embodiments allow for even greater balance and for heat from combustion to be pulled away from the center of the cylinder and the intake. In some embodiments, the heat pulled away is used to preheat the intake. In other embodiments, the heat is not used to preheat intake. Nevertheless, it will be appreciated that in other embodiments utilizing the offset valve design, the intake and exhaust valve locations are reversed. In some embodiments, the central valve functions as both an intake and an exhaust valve. In some embodiments, all valve locations are capable of being either intake, exhaust and/or both intake and exhausted depending upon the desired flow characteristics desired within the cylinder. In various embodiments, the order, duration, and/or timing of each valve opening and closing varies and is designed to achieve desired flow characteristics within the cylinder. It will be appreciated that the offset valve design of the inventive concept will be utilized in various embodiments with compression ignition as well as conventional ignition engines.

Referring to FIGS. 18A, 18B and 18C, some embodiments of the inventive concept include a multi-stage direct injector. The injector includes a "stepped" injector pin that is pulled up from its seat a small amount to open a first stage that allows a first lowest amount of flow. Referring to FIG. 18A, the injector pin 1000 is in a seated position within housing 1200, in which no fluid flow will occur. FIG. 18B shows the injector pin 1000 after it has moved from the seated position to open a first stage of fluid ports 1100. As the injector is pulled further up, it opens successively larger holes through its stepped design to open second, third, fourth, fifth, etc. stages, increasing the amount of flow progressively at each stage. FIG. 18C shows the injector pin 1000 after it has moved from the first stage of FIG. 18B to a second stage in which additional fluid ports 1100 have been open. As is shown in FIG. 18C, a third stage of fluid ports 1100 remain closed by injector pin 1000. In some embodiments, O-rings are included along each stage of the injector to improve sealing. In the embodiments shown in FIGS. 18A, B and C, a single fuel/fluid line is shown feeding the injector. In other embodiments, each stage of the injector is fed by a separate fuel line. In this manner, the injector is utilized in some embodiments to feed different fuels types or other fluids through each stage. For example, in some embodiments (such as in a drag car), a first stage injects alcohol, a second stage injects a first stage of nitrous, and a third stage injects a second stage of nitrous. In some embodiments, the injector of the inventive concept is utilized in connection with a carbureted engine, while in other embodiments it is utilized as part of a fuel injection system. In some embodiments, the injector of the inventive concept is utilized on a turbine fan. In other embodiments, the injector is utilized as a plastics injector, e.g. for multiple-stage injection molding of plastics. In still other embodiments, the injector is utilized as an oil injector. In various embodiments, the present invention includes one or more injector, such as one or more direct fuel injector, extending through a wall of the head into one or more chamber.

Figure 19A:
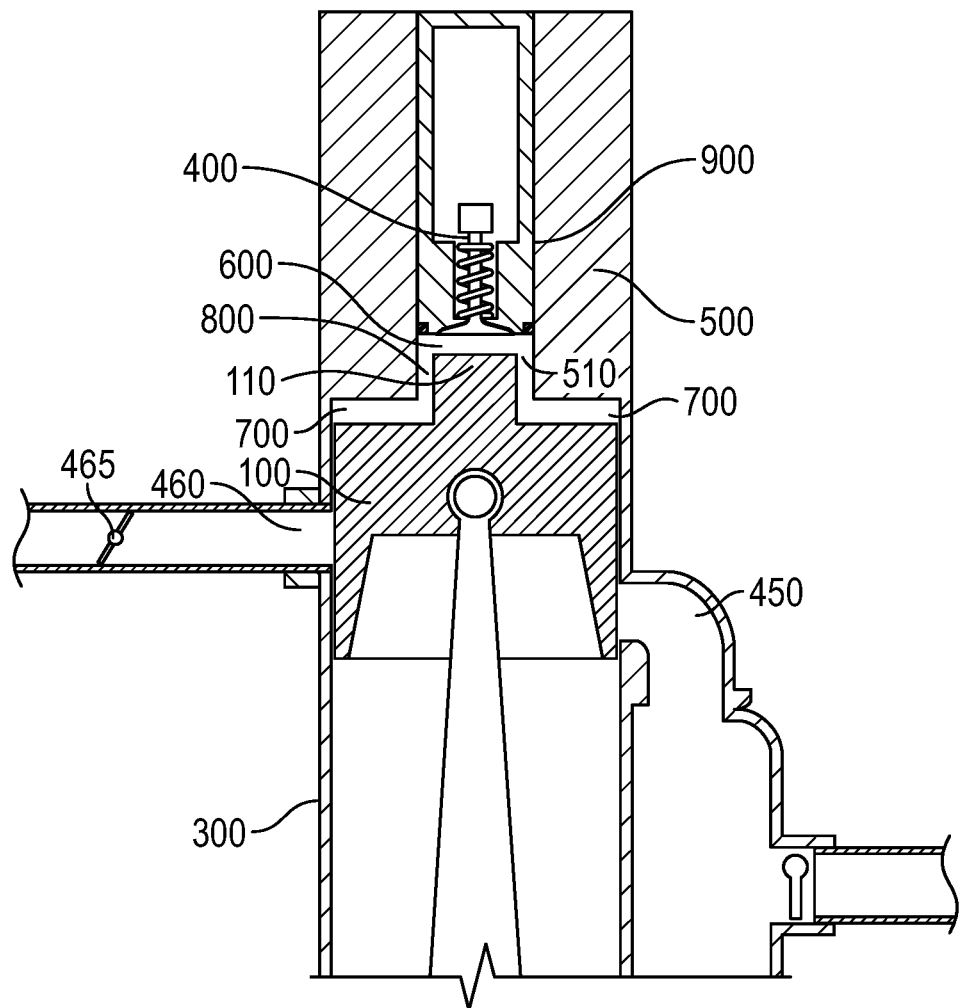
FIG. 19A shows embodiment of two cycle engine of the inventive concept in which the piston functions as the exhaust and intake valves, and further including a butterfly valve within the exhaust outlet to trap heat and exhaust gas inside the combustion chamber to aid in compression ignition.
Figure 19B:
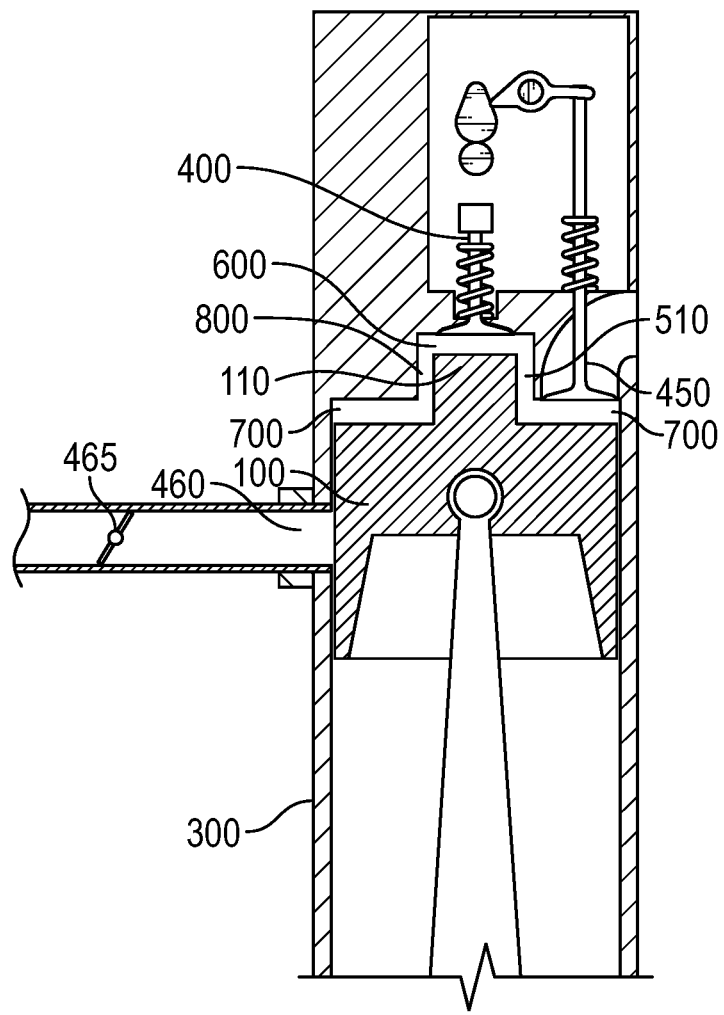
FIGS. 19B and 19C show other embodiments of engines of the inventive concept that include a butterfly valve within an exhaust outlet to trap heat and exhaust gas inside the combustion chamber to aid in compression ignition.
Figure 19C:
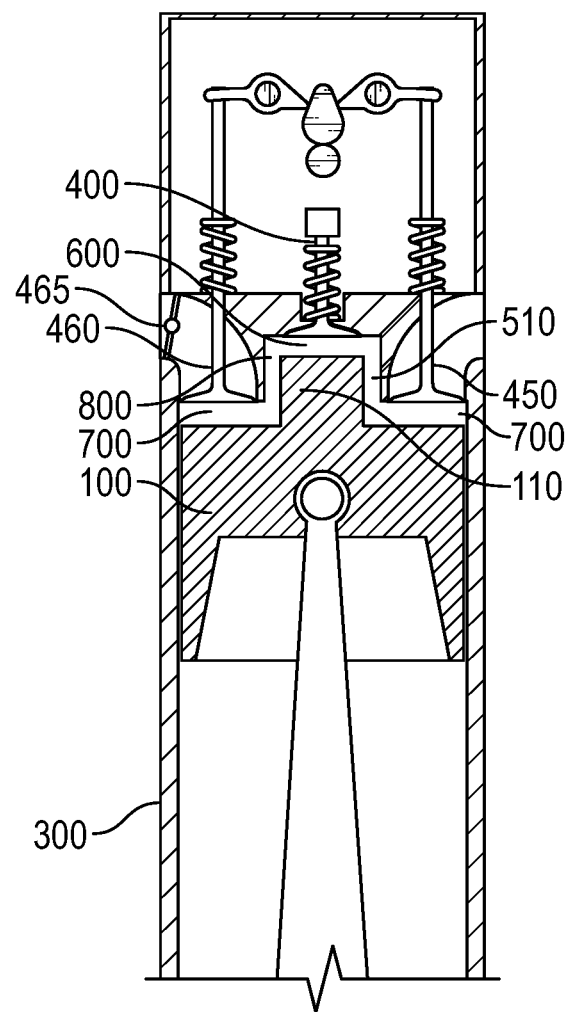

Referring to FIGS. 19A, B, and C, various embodiments of engines of the inventive concept are shown including a butterfly valve 465 designed to trap selectively heat and/or exhaust gases within the combustion chamber to aid in compression ignition. FIG. 19A shows an embodiment of a two cycle engine of the inventive concept in which the piston functions as the exhaust and intake valves selectively block intake 450 and exhaust outlet 460, and further including a butterfly valve 465 within the exhaust outlet 460 to trap selectively heat and exhaust gas inside the combustion chamber to aid in compression ignition. Intake valve 400 is located within recess 510 of the cylinder head to reduce and/or eliminate trap volume within that portion of the combustion chamber. In some embodiments of the engine shown in FIG. 19A, in which a single exhaust port is present, the butterfly valve 465 is never 100% closed. Instead, the valve is partially closed to trap part of the exhaust and preheat the intake. In other embodiments, in which multiple exhaust ports, or lines, are present, the butterfly valve 465 is capable of closing a portion of the exhaust 100% to provide the desired flow restriction and/or preheating affect. FIG. 19B shows the butterfly valve 465 in an embodiment in which the piston functions as the exhaust valve and in which a separate intake valve 450 is utilized along with valve 400. FIG. 19C shows the butterfly valve 465 in an embodiment of a two or four cycle engine in which the exhaust valve is located within the head along with intake valves 450 and 400. In will be appreciated that in other embodiments the butterfly valve 465 is utilized in engines that only include a single combustion chamber, compared to the primary and secondary (tertiary and so forth) chambers shown in FIGS. 19A through 19C. Furthermore, although not shown in FIGS. 19B and 19C, it will be appreciated that the variable compression ratio piston 900 is included in various embodiments of the inventive concepts of FIGS. 19B and 19C. Similarly, various embodiments of the inventive concept of FIG. 19A are utilized without the variable compression ratio piston 900 shown therein.

Various embodiments of the instant inventive concept described herein are included and/or utilize multiphasic dynamic compression ignition combustion in a two cylinder supercharged engine of the type discussed in PCT/US2014/64866, the entire disclosure of which is incorporated herein by reference. It is understood that various embodiments of the inventive concept disclosed herein include single cylinder, two cylinder, and additional cylinder (e.g. 3, 4, 5, 6, 7, 8, etc. cylinders) structures, and also include structures with and without any type of intake boost (e.g. superchargers and/or turbo chargers) (including, but not limited to the structures disclosed in PCT/US2014/64866).

Figure 20:
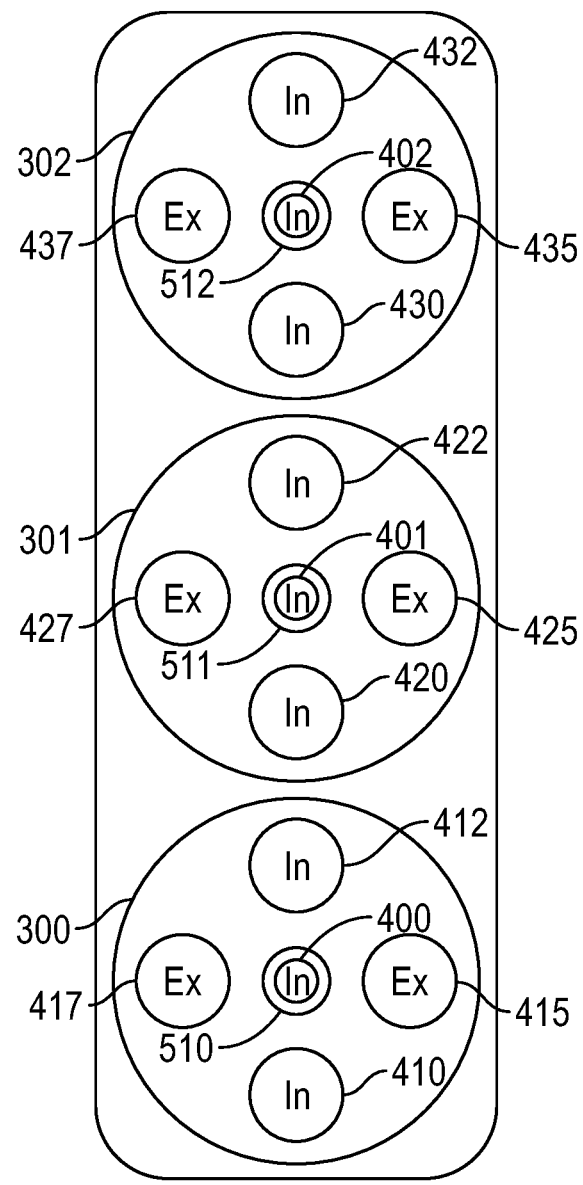
FIG. 20 shows a representative top plan view of a three cylinder Siamese cylinder engine, depicting the cylinder and valve arrangement of an embodiment of the inventive concept.
Figure 21:
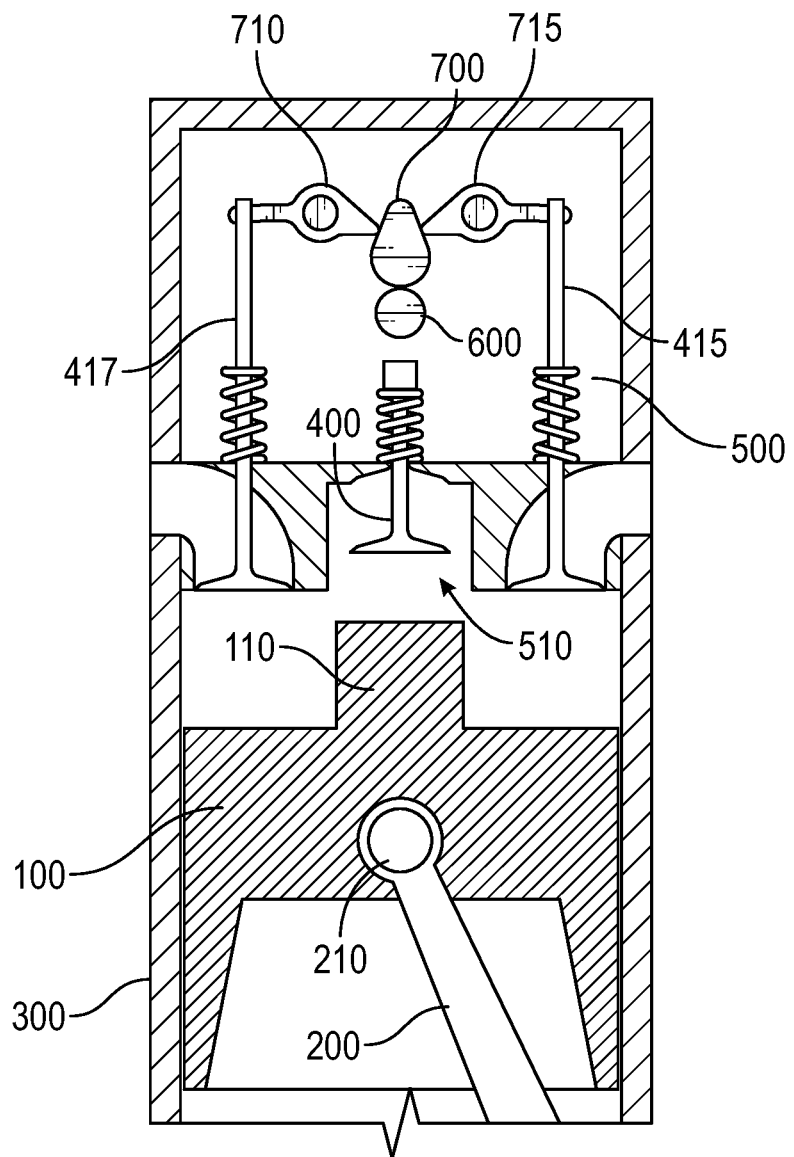
FIG. 21 shows a front cross-section elevation view of the engine of FIG. 20.
Figure 22:
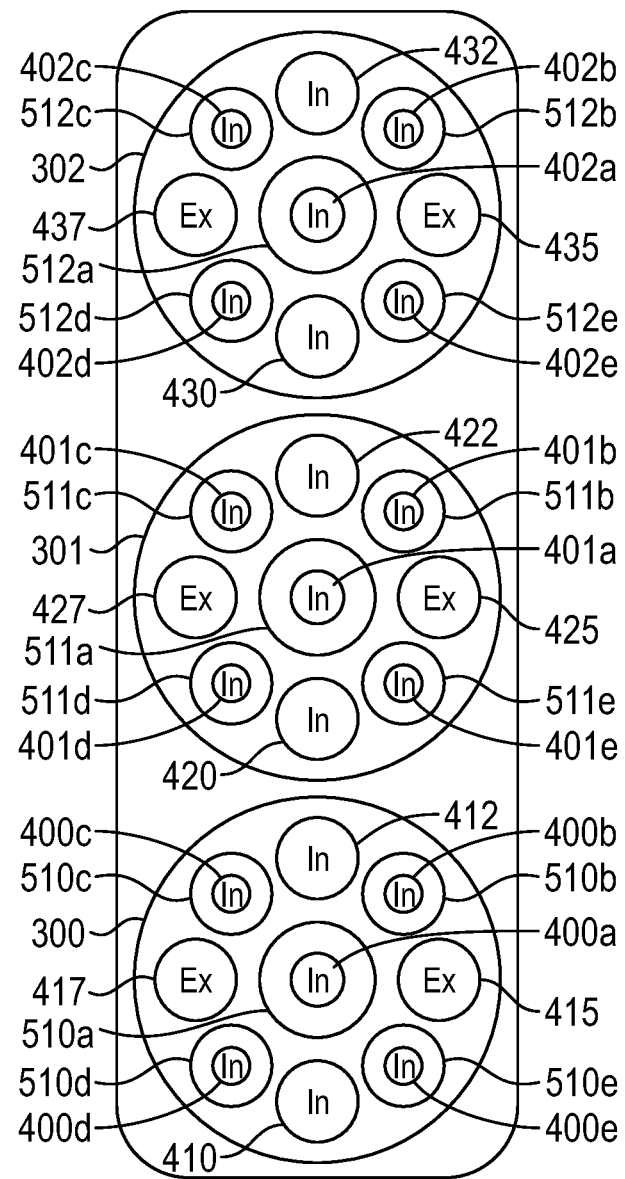
FIG. 22 shows a representative top plan view of another embodiment of a three cylinder Siamese cylinder engine that includes multiple protuberances of the inventive concept.

Referring to FIGS. 20 and 21, an exemplary embodiment of the inventive concept is shown as a three cylinder, Siamese cylinder, engine which includes three pistons 100 within cylinders 300 (and 301 and 302), that each includes a generally central protuberance 110 protruding from the top of the main body of the piston. The cylinder head 500 includes a generally central recess 510 (and 511 and 512) within each cylinder that is configured to matingly receive the protuberance 110 of the piston for each cylinder. The central protuberance 110 of the piston is adapted to be slidingly received in the central recess 510 (and 511 and 512) of the head. As the piston moves up toward top dead center, the central protuberance 110 of the piston slides into the central recess 510 (and 511 and 512) of the head, creating a primary combustion chamber, and secondary combustion chamber. In some embodiments, the respective volumes of primary combustion chamber and secondary combustion chamber are designed such that the compression ratio and/or pressure ratio of the primary combustion chamber is higher than that of the secondary combustion chamber (in other embodiments, the reverse is true). In that manner, auto-ignition is obtained in the primary combustion chamber either before, at, or after the piston reaches top dead center, without resulting in auto-ignition within the secondary combustion chamber. As the piston moves down from top dead center and protuberance 110 moves out of recess 510 (and 511 and 512) of the head, the pressure created by the combustion within the primary combustion chamber is allowed to expand into the secondary combustion chamber, initiation combustions, ignition and/or combustion ignition within the secondary combustion chamber. In some embodiments, auto-ignition is initiated from pressure propagation through blow-by of primary to secondary combustions chambers, or vice versa.

With respect to each of the cylinders, a central intake valve 400 (and 401 and 402) is located within the recess 510 (and 511 and 512) of the cylinder head to reduce and/or eliminate trap volume within the combustion chamber, and to ensure a homogenous air/fuel/EGR mix within the entire combustion chamber (primary and secondary chambers). In the embodiment shown, additional intake valves 410 (and 420 and 430) and 412 (and 422 and 432) and exhaust valves 415 (and 425 and 435) and 417 (and 427 and 437) are located in the secondary combustion chamber areas. In the embodiment shown, all intake valves (400, 401, 402, 410, 412, 420, 422, 430 and 432) are positioned along a centerline of the engine block. In this manner intake valves 412, 420, 422 and 430 are located in close proximity and adjacent to the cylinder walls of adjoining pistons, which are locations in which hot spots are created. The location of the valves and air flow created through the valves allows heat to soak between adjoining cylinders and away from the hot spot locations. The improved balance of heat throughout the engine allows for greater control and use of compression ignition. It will be appreciated that the balancing of heat of the inventive concept is utilized in combination with single cylinder and other multiple cylinder embodiments (e.g. 2 cylinder, 4 cylinder, etc.).

Referring to FIG. 21, a dual overhead cam arrangement is shown. Central intake valves 400, 401 and 402 are controlled by overhead cam shaft 1600. Secondary combustion chamber intake valves 410, 412, 420, 422, 430 and 432, as well as exhaust valves 417, 417, 425, 425, 435 and 437 are all controlled by overhead cam shaft 1700 located directly above overhead cam shaft 1600. Rocker arms 715 and 710 (rocker arms associated with cylinders 301 and 302 not shown) extend from cam shaft 1700 to exhaust valves 415 and 417, respectively. In other embodiments, a single cam is utilized to control all valves. In still other embodiments, three or more cams are utilized. In some three cam embodiments, a central cam shaft controls the central intake valves, while a cam on each side of the engine controls the respective valves on that side of the engine. In still other embodiments, mechanical, electronic and/or hydraulic controllers and/or a combination thereof or utilized to control the various valves. It will be appreciated that in various embodiments, some or all exhaust valves shown herein are utilized as intake valves, and some or all intake valves shown herein are utilized as exhaust valves. In addition, in some embodiments, the same valve functions as both an exhaust and intake valve, depending upon the desired engine performance. Although a duel overhead cam is shown in FIG. 21, in other embodiments, a single cam is utilized to control both the exhaust and the intake. In other embodiments, three or more cams are utilized. In still other embodiments, other mechanisms for valve actuation are utilized. In some embodiments, the intake valves are electronically actuated, while the exhaust valves are mechanically controlled by a cam. Although not shown in FIG. 21, it will be appreciated that in some embodiments a variable compression ratio piston is utilized in combination with the structure shown in FIG. 21.

In some embodiments, the multiple intake valves shown within a single cylinder (e.g. in FIG. 20) are controlled to open in a staggered pattern to help control roll and tumble of the air/fuel/EGR mixture within the combustion chamber. In some embodiments in which the intake valves are controlled by a cam, the valves opening is staggered from 1-20 degrees from one another. In some embodiments, one intake valve is opened at a time in a staggered pattern. In other embodiments, multiple valves are open at the same time with another valve opened in a staggered pattern. It will be appreciated that the pattern will vary in different embodiments depending upon the desired sweeping motion within the combustion chamber as well as the physical shape, size and design of the components.

Referring to FIG. 21, in the embodiment shown, the design of piston 100, with the protuberance 110 located at the center of piston 100, allows the wrist-pin 210 to attach rod 200 to the piston at a location of increased thickness of the piston (due to the protuberance). This increases strength at a location that otherwise is under increased stress. In addition, the relatively high connection on the piston allows for greater control of the piston and decreased piston slap as the piston moves up and down within the cylinder.

In some embodiments of the engine shown in FIGS. 20 and 21, intake and exhaust manifolds are designed such that the at least a portion of the exhaust lines are in physical contact, or at least in close proximity to the intake lines. In this manner the exhaust lines are utilized to preheat the intake. In some embodiments, a butterfly valve, similar to that shown in FIGS. 19A, B and C, is utilized to divert exhaust gas from a portion of the exhaust manifold that is in contact/proximity to the exhaust lines to a portion of the exhaust manifold that is positioned away from the intake lines. In this manner, the preheating can be selectively engaged and disengaged utilizing the valve. In some embodiments, the valve is located at a "T" in the manifold, and the exhaust lines come out from the ports generally in parallel to the intake lines, with the "T" diverting the exhaust down and away from the intake lines, or when not selectively diverted, allowing the exhaust gases to flow through the portion of the manifold that continues in parallel to the intake lines (and in contact or close proximity to the intake lines). In some embodiments there is a separate intake line entering from each side of the engine, along with exhaust lines on each side of the engine, to provide balanced heat transfer. In some embodiments, the intake and exhaust line on each side of the engine are side-by-side (in physical contact or close proximity to one another) and bend upward toward the top of the engine. The intake lines meet each other and connect together at the top of the engine and in some embodiments a fuel injector is located at the top of the intake. In some embodiments, the exhaust lines also meet each other and connect together and flow outward in a single exhaust pipe near the point of intersection. In other embodiments, each exhaust line continues over the top of the engine and down the opposing side from which it originated and then outward from the engine. In some embodiments, the intake and exhaust manifold is a single molded or cast piece that bolts over the engine head. In some embodiments in which the intake lines come together at the top of the engine Referring to FIG. 22, a top plan view of another embodiment of a three cylinder Siamese cylinder engine that includes multiple protuberances of the inventive concept. In addition to protuberance 110 (which in FIG. 22 engages with recesses 510*a*, 511*a*, and 512*a*), other protuberances are located around the top of the piston surrounding protuberance 110 and engage with recesses 510*b, c, d,* and *e,* 511*b, c, d,* and *e,* and 512*b, c, d* and *e*. It will be appreciated that the numbers, sizes, shapes and locations of the protuberances will vary in different embodiments. In some embodiments, each protuberance has a different volume to provide a different compression result (e.g. creating primary, secondary, tertiary, etc. combustion chambers). In other embodiments, the volume of each protuberance is equal to provide the same compression within each recess.

Referring to FIGS. 23-57, some embodiments of the present invention include one or more valve positioned in an engine block, such as in a flat head configuration. In some embodiments, the valves are placed in the engine block beside the piston with a recess in the cylinder head creating a corridor connecting the valves to the combustion chamber. In some embodiments, the valves are located to one side of the piston, and/or only one intake and one exhaust valve are utilized for each piston. In the embodiment shown in FIGS. 23-25, two exhaust and two intake valves are utilized with each cylinder. In some embodiments, one intake and one exhaust valve are located on each side of the piston. In other embodiments, two intake valves are located on one side and two exhaust valves are located on the other side. Still in other embodiments, a single valve is intake and three valves are exhaust. In further embodiments a single valve is exhaust and 3 valves are intake. In still other embodiments, more than 2 valves are located on each side of the piston, with various arrangements of intake and outs. In still further embodiments, some valves function as both intake and exhaust.

Figure 23:
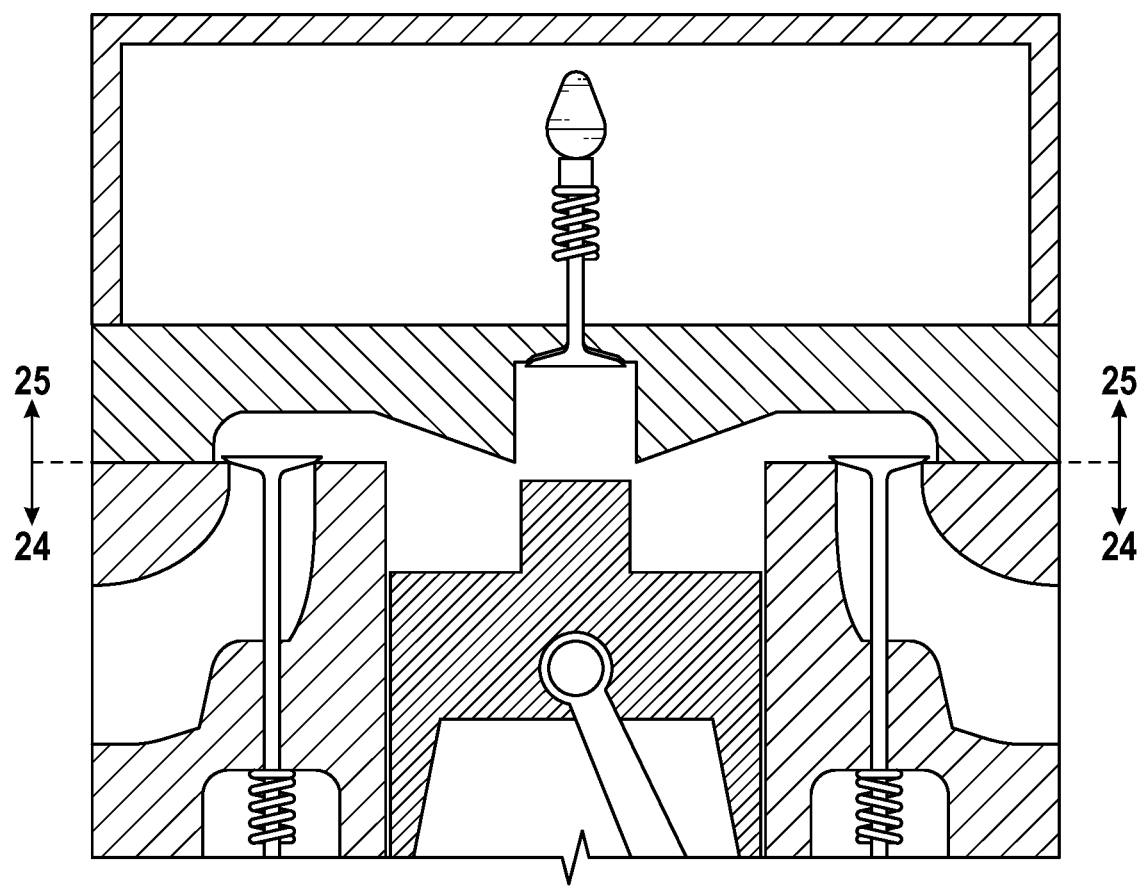
FIG. 23 shows a cross-sectional view of a multi-zone combustion chamber compression ignition engine of a flat-head (or side-valve) engine style embodiment of the instant inventive concept.
Figure 24:
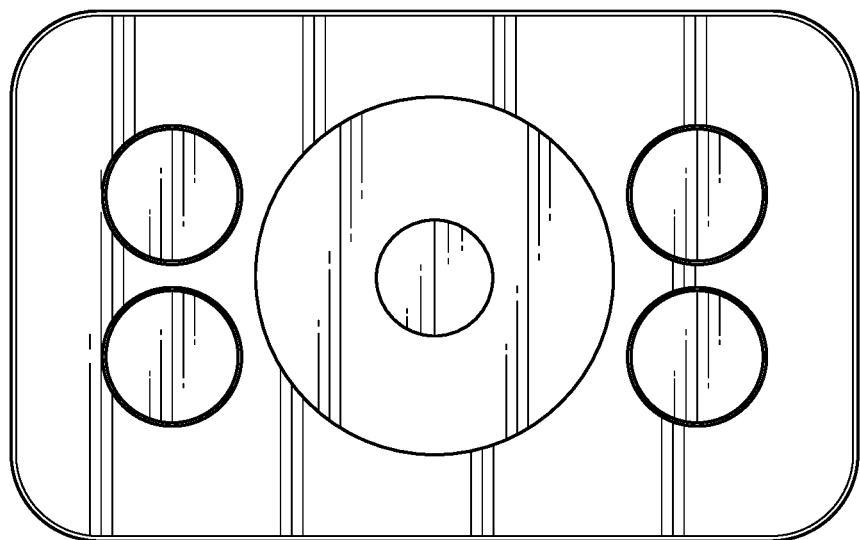
FIG. 24 shows a cross sectional view of the engine block of the engine of FIG. 23 taken along section line 24-24 of FIG. 23.
Figure 25:
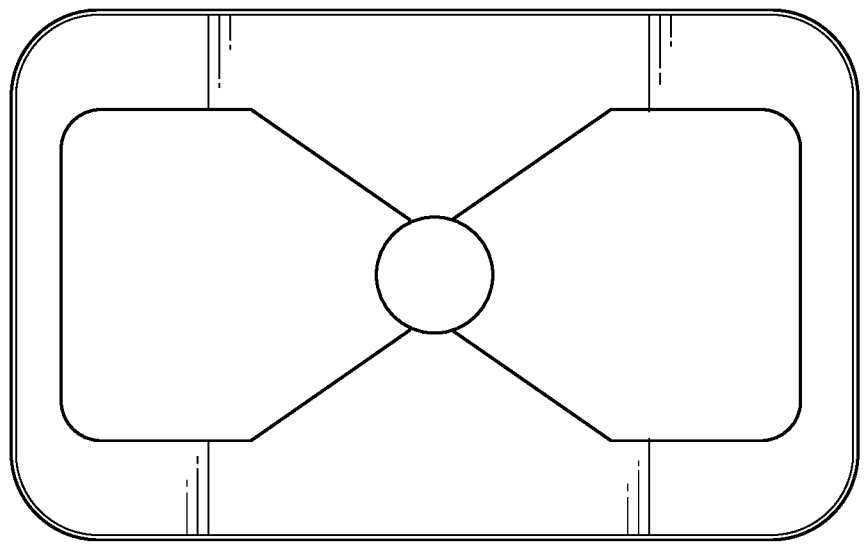
FIG. 25 shows a cross sectional view of the cylinder head of the engine of FIG. 23 taken along section line 25-25 of FIG. 23.
Figure 26:
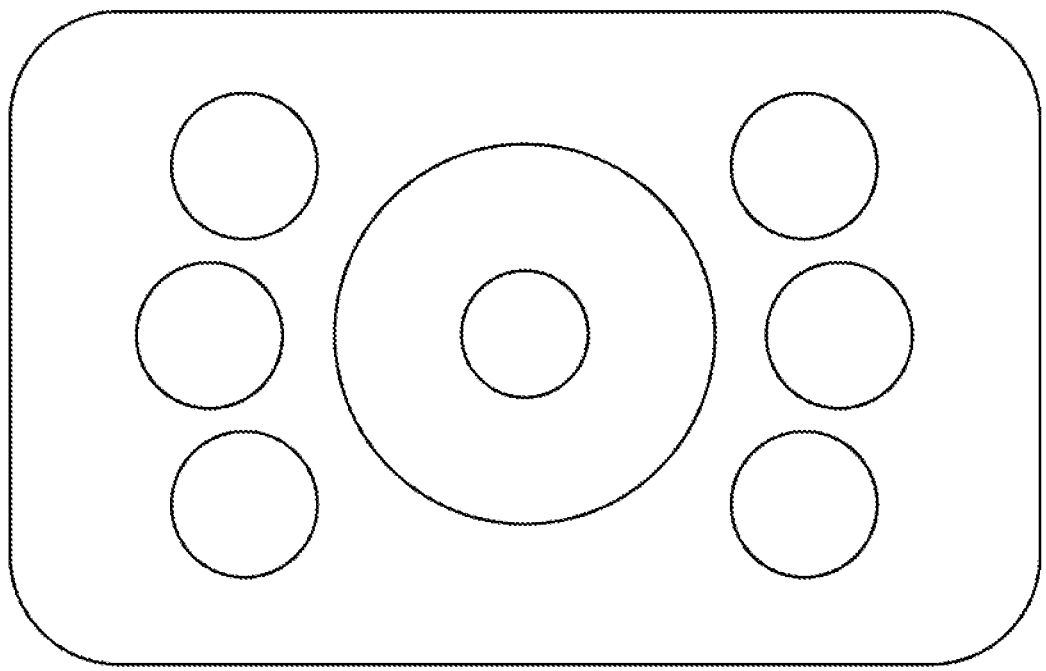
FIG. 26 shows a top view of an embodiment of engine block having six side valves positioned along an arc on either side of a piston.
Figure 27:
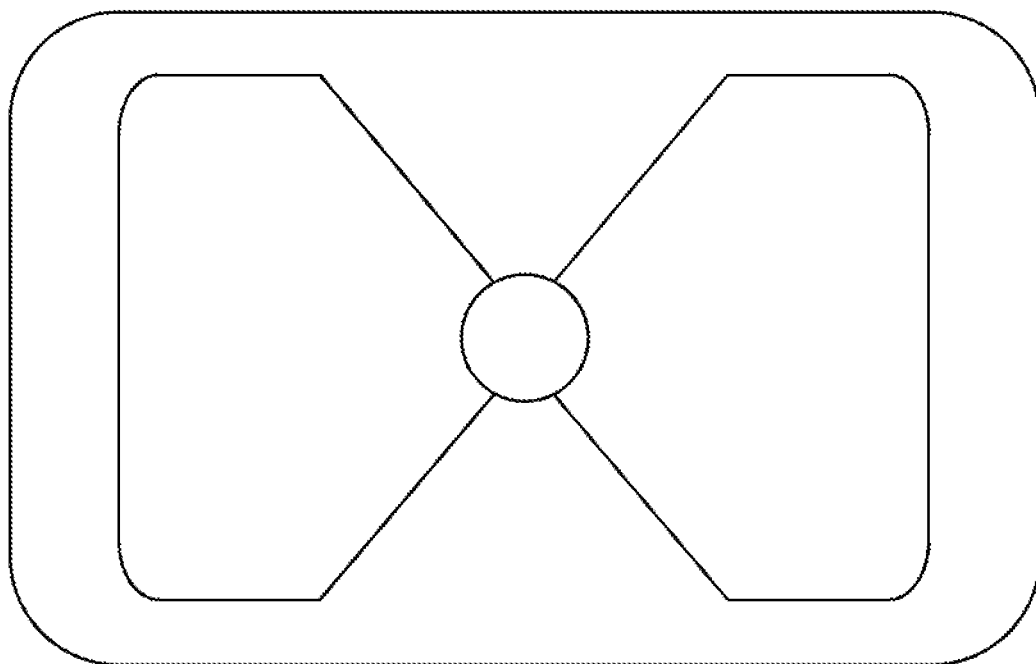
FIG. 27 is a bottom view of a head associated with the engine block of FIG. 26, the head defining a recess creating a corridor connecting the valves to the combustion chamber of the engine block.
Figure 28:
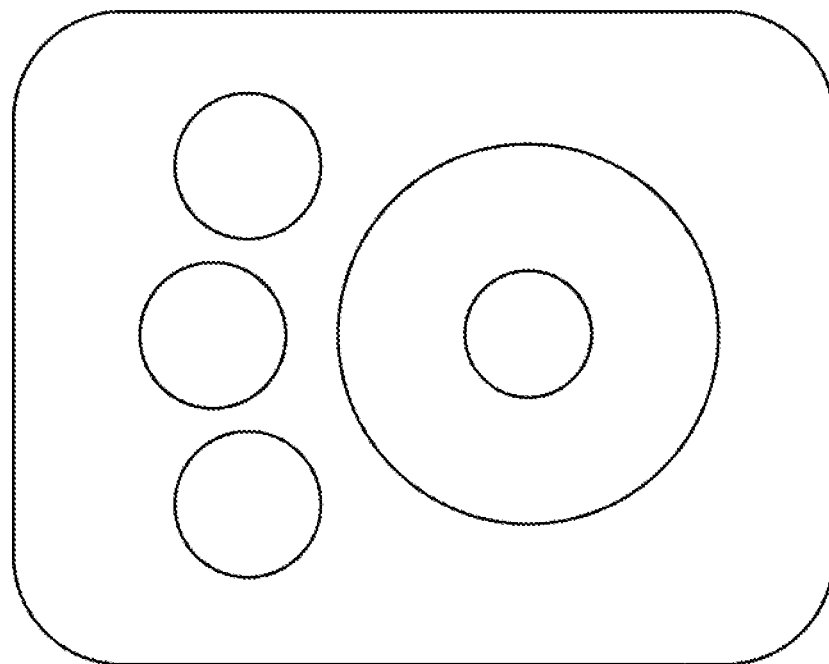
FIG. 28 shows a top view of an embodiment of engine block having three side valves positioned along an arc on one side of a piston.
Figure 29:
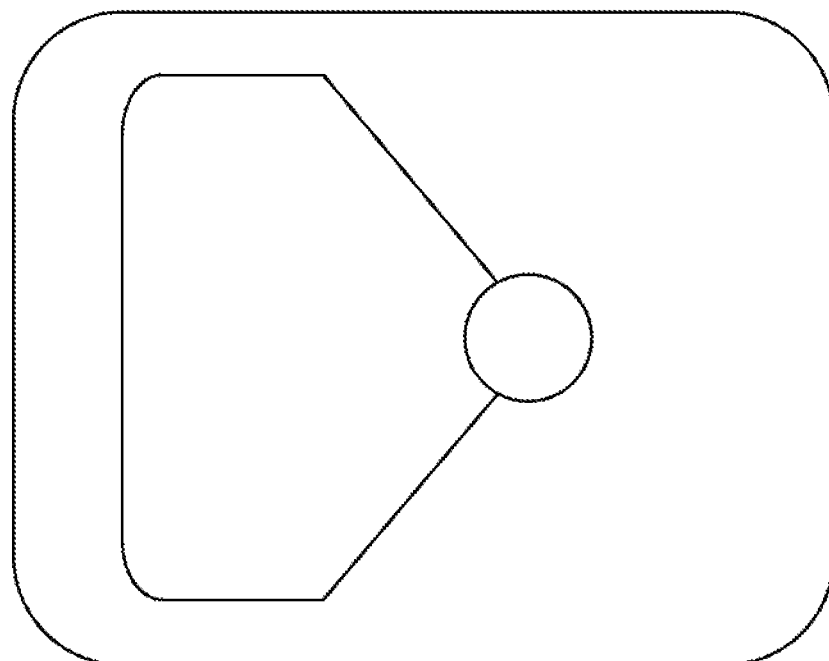
FIG. 29 is a bottom view of a head associated with the engine block of FIG. 28, the head defining a recess creating a corridor connecting the valves to the combustion chamber of the engine block.
Figure 30:
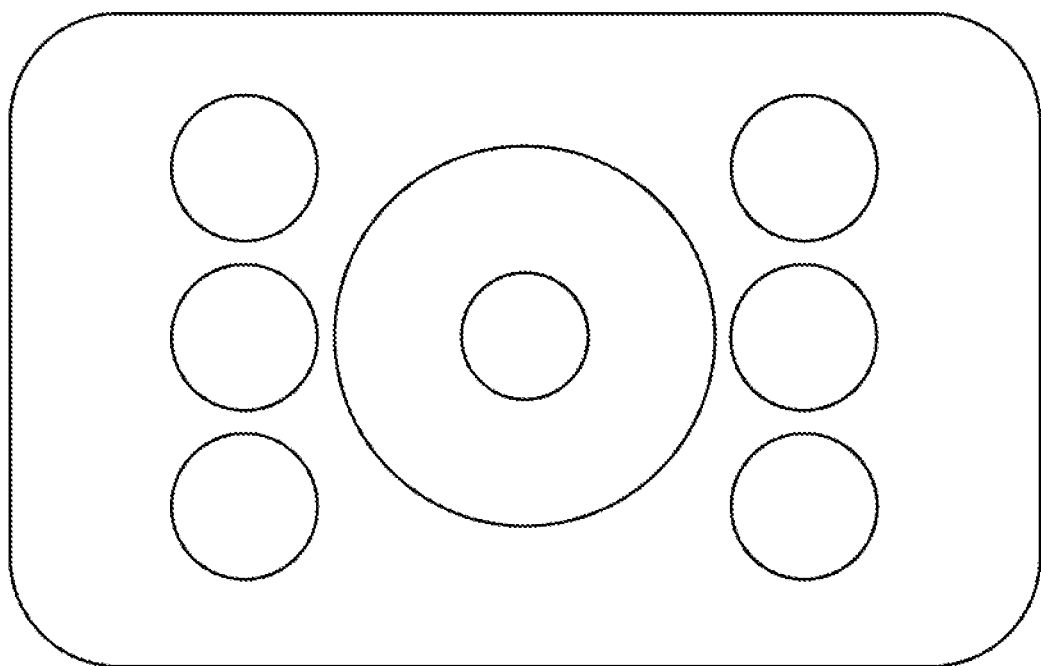
FIG. 30 is a top view of an embodiment of an engine block similar to the embodiment of FIG. 26 with each set of valves being positioned along a straight line along either side of the piston.
Figure 31:
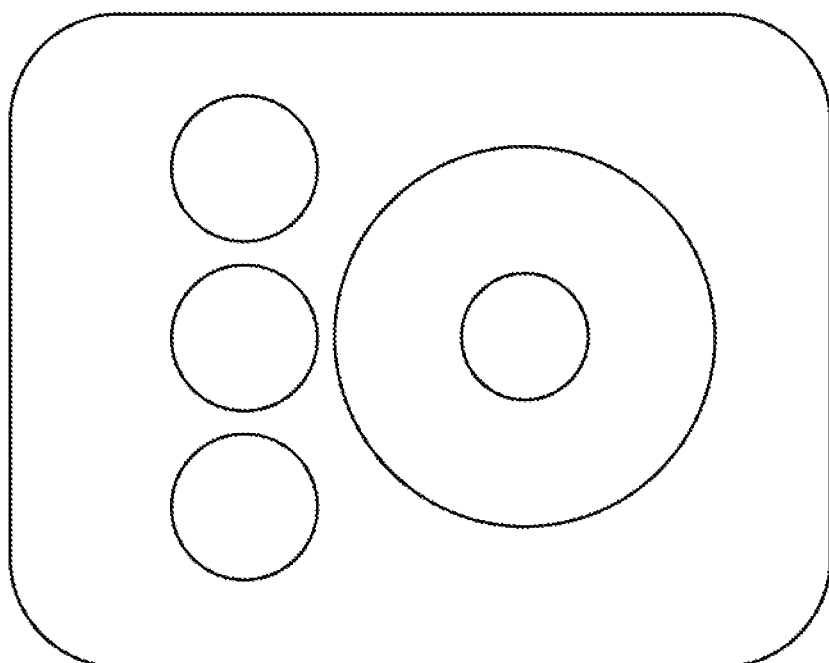
FIG. 31 is a top view of an embodiment of an engine block similar to the embodiment of FIG. 28 with the valves being positioned along a straight line along one side of the piston.
Figure 32:
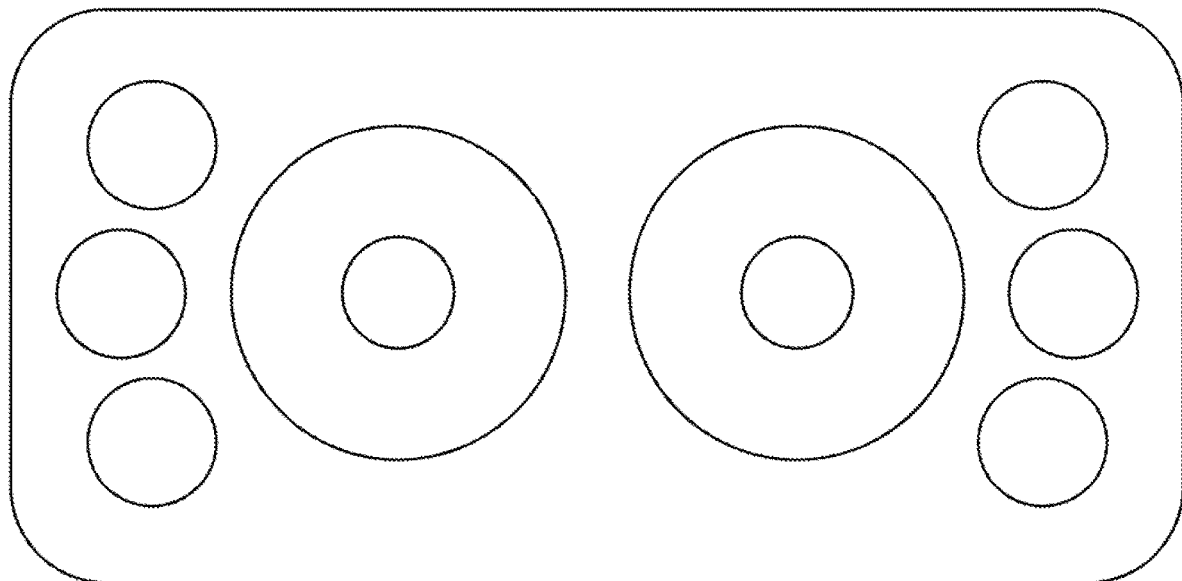
FIG. 32 shows a top view of an embodiment of engine block having first and second pistons positioned adjacent to each other.
Figure 33:
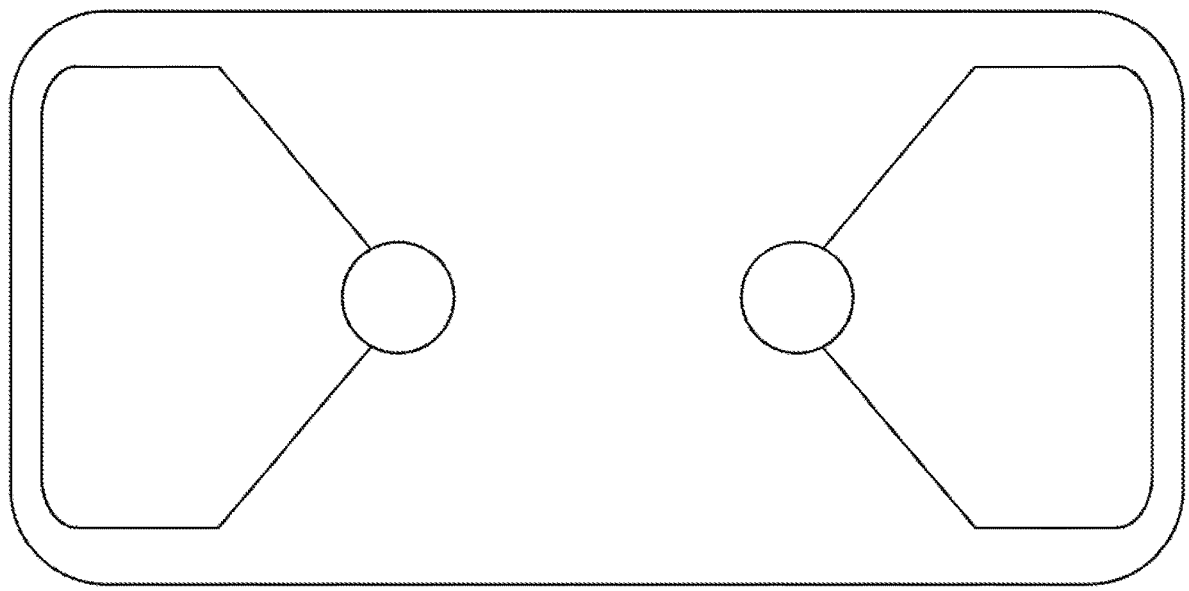
FIG. 33 is a bottom view of a head associated with the engine block of FIGS. 32 and 34, the head defining a recess associated with each piston, each recess creating a corridor connecting each set of valves with a respective combustion chamber of the engine block.
Figure 34:
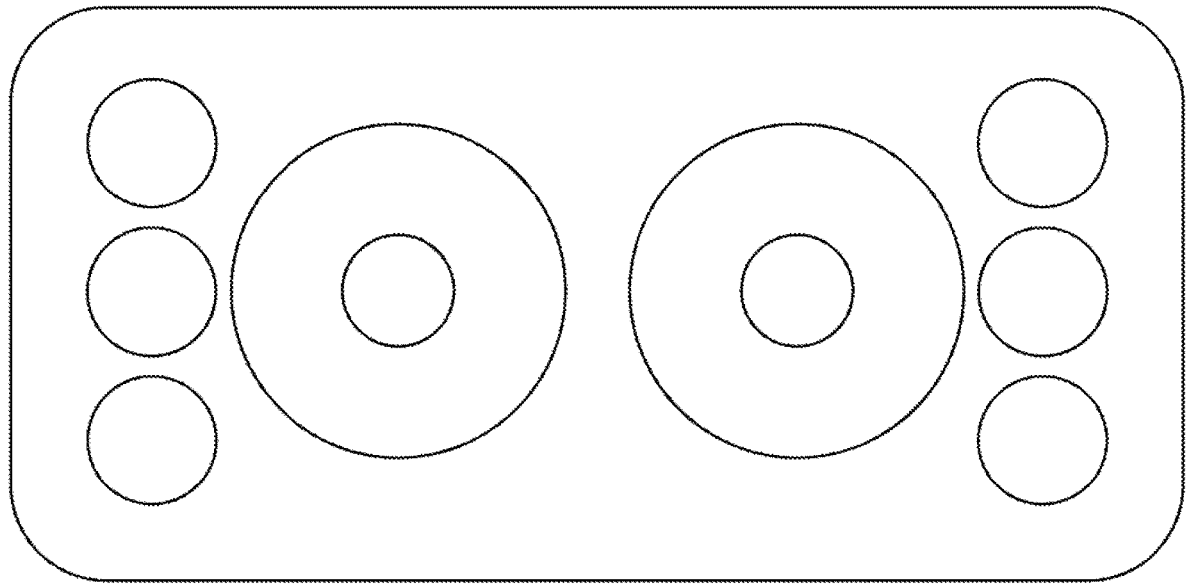
FIG. 34 is a top view of an embodiment of an engine block similar to the embodiment of FIG. 32 with each set of valves being positioned along a straight line along respective sides of respective pistons.
Figure 35:
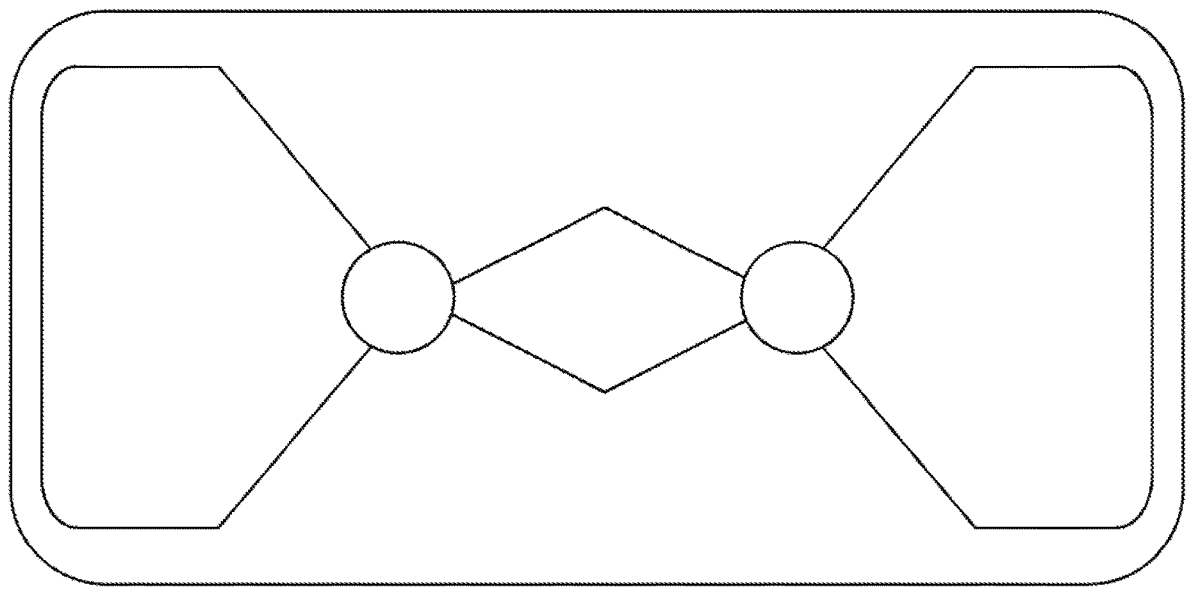
FIG. 35 is a bottom view of a head associated with the engine block of FIGS. 32 and 34, the head defining a recess associated with each piston for creating a corridor connecting each set of valves with a respective combustion chamber of the engine block and a recess connecting the combustion chambers to each other.
Figure 36:
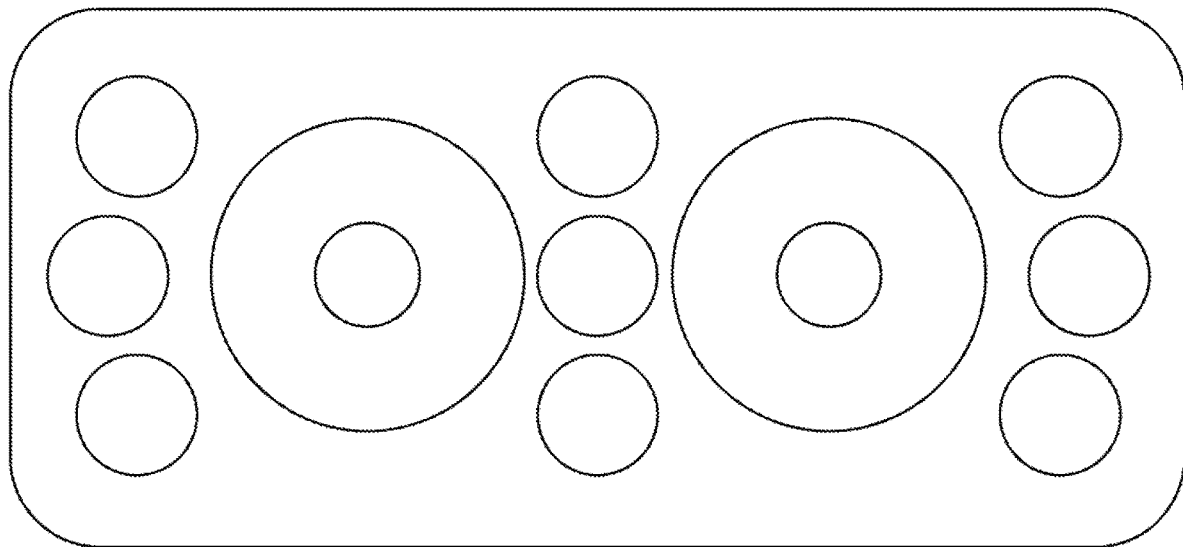
FIG. 36 shows a top view of an embodiment of engine block having first and second pistons.
Figure 37:
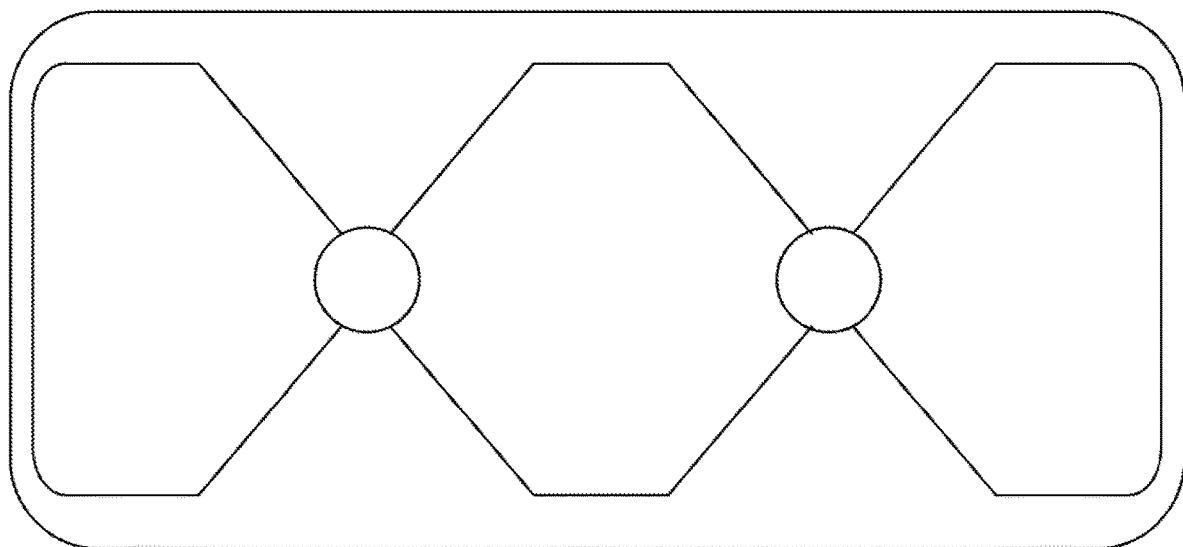
FIG. 37 is a bottom view of a head associated with the engine block of FIGS. 36, 38, 39, and 40, the head defining first and second recess creating first and second corridors connecting respective first and second sets of valves with respective first and second combustion chambers of the engine block and a third recess connecting the third set of valves to each of the first and second combustion chambers. It will be appreciated that other embodiments include different recess configurations.
Figure 38:
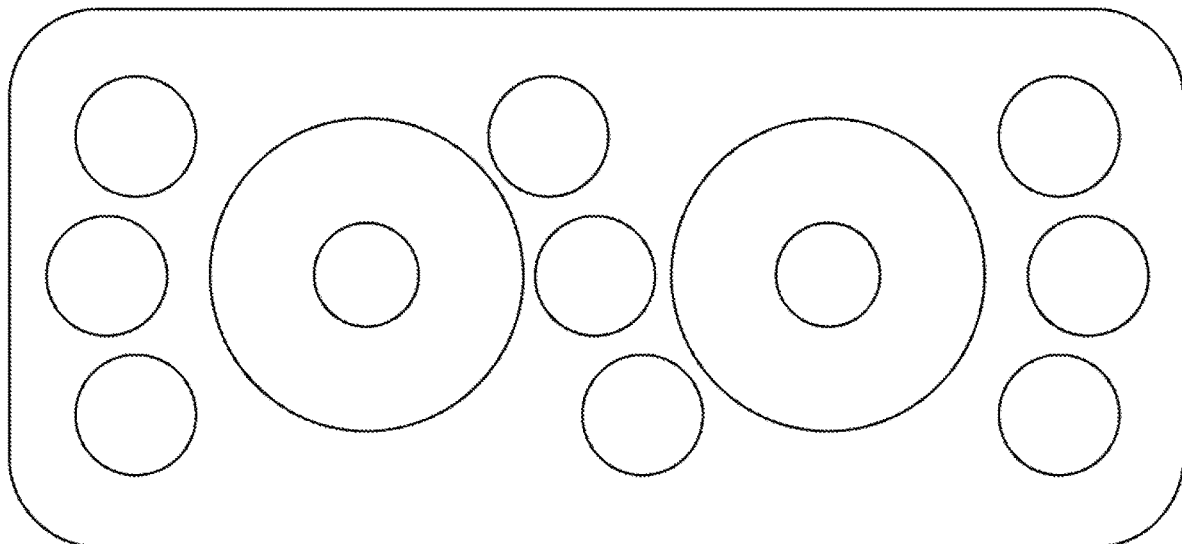
FIG. 38 is a top view of an embodiment of an engine block similar to the embodiment of FIG. 36 with two of the valves of the third set of valves being positioned along a first arc associated with the first piston and two of the valves being positioned along a second arc associated with the second piston, the center valve being positioned at an intersection point of each of the first and second arcs.
Figure 39:
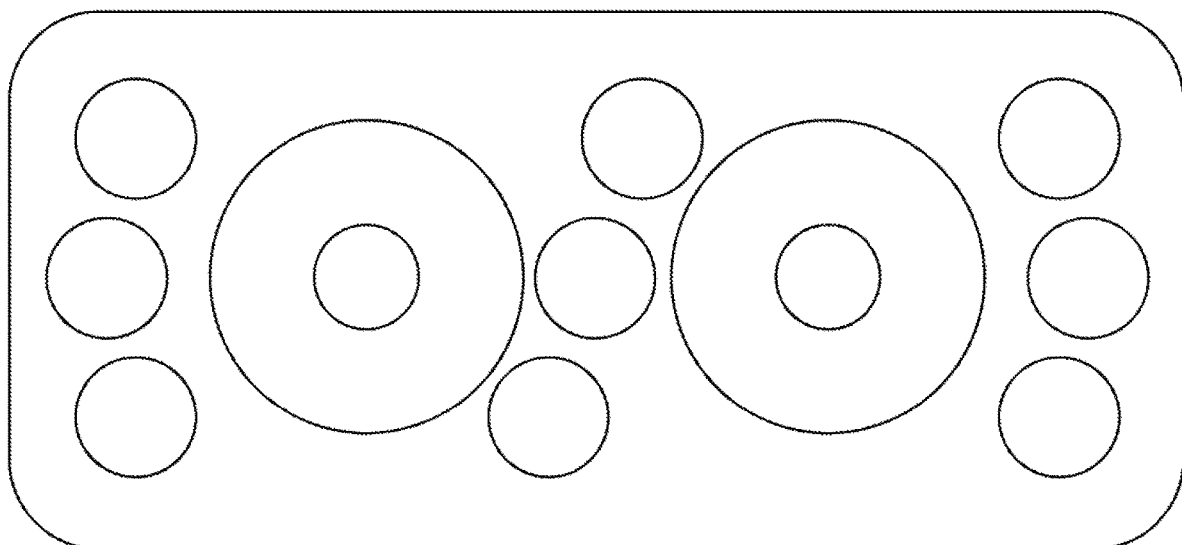
FIG. 39 is a top view of an embodiment of an engine block similar to the embodiment of FIG. 36 with two of the valves of the third set of valves being positioned along a second arc associated with the second piston and two of the valves being positioned along a first arc associated with the first piston, the center valve being positioned at an intersection point of each of the first and second arcs.
Figure 40:
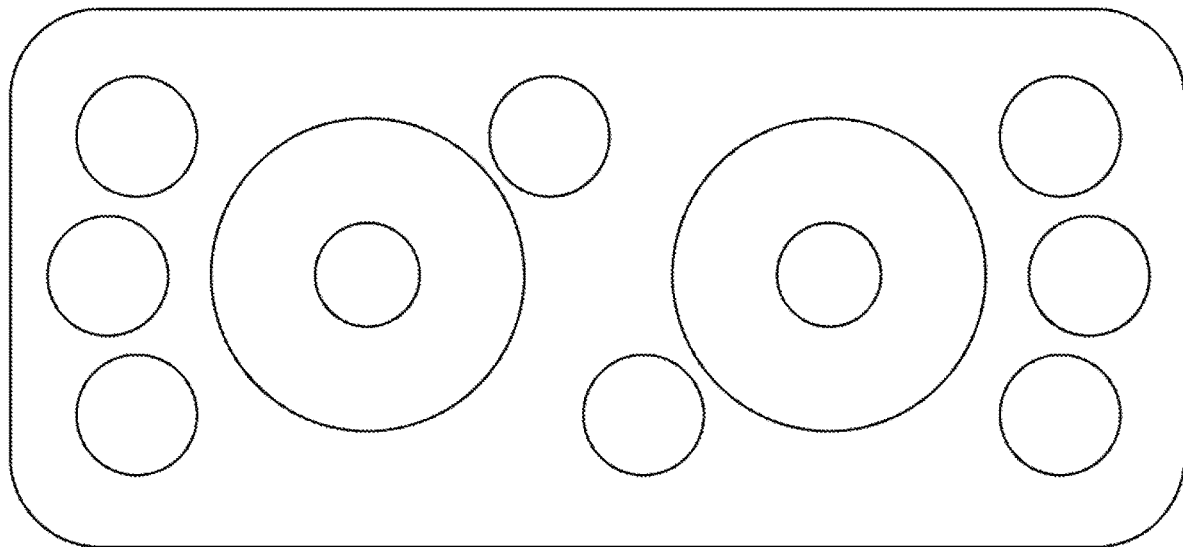
FIG. 40 is a top view of an embodiment of an engine block similar to the embodiment of FIG. 40 with the center valve of the third set of valves being removed.
Figure 41:
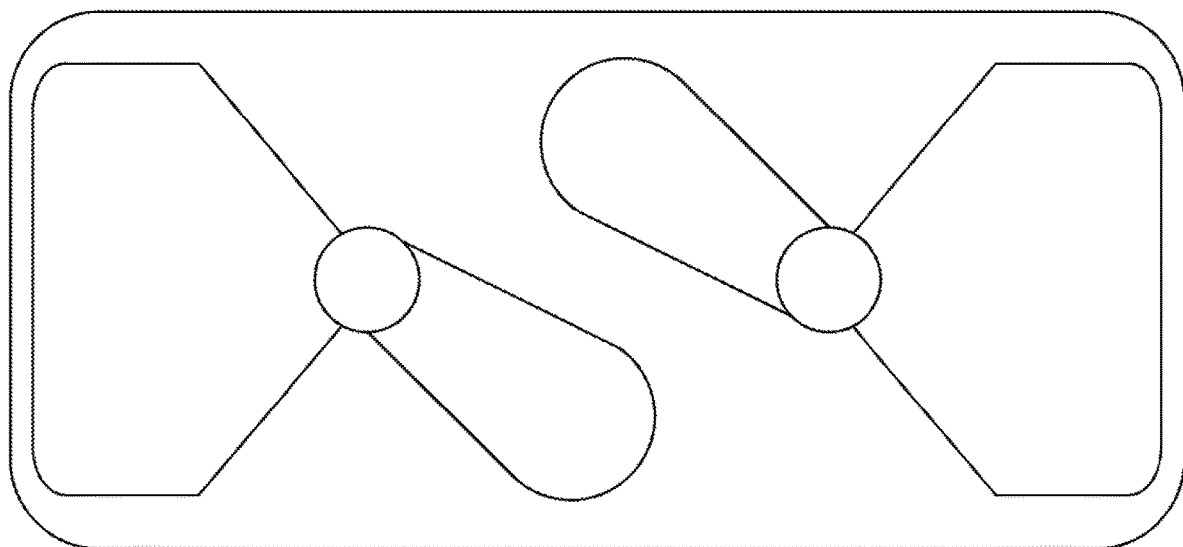
FIG. 41 is a bottom view of a head associated with the engine block of FIG. 40, the head defining first and second recesses creating respective first and second corridors connecting respective first and second sets of valves with a respective combustion chamber of the engine block. The head further defines a third recess connecting the first combustion chamber with a first valve of the third set of valves and a fourth recess connecting the second combustion chamber with a second valve of the third set of valves.
Figure 42:
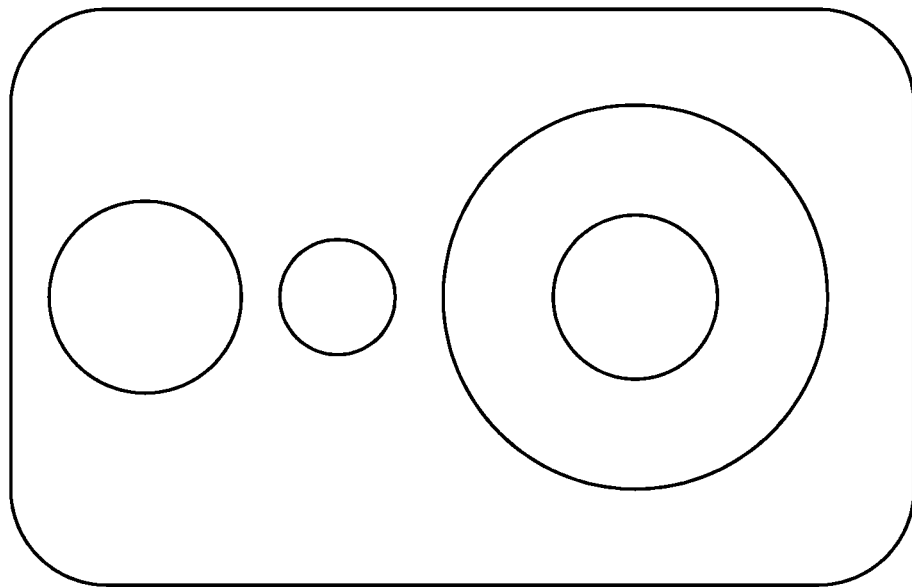
FIG. 42 shows a top view of an embodiment of engine block having two side valves positioned inline with the engine crank.
Figure 43:
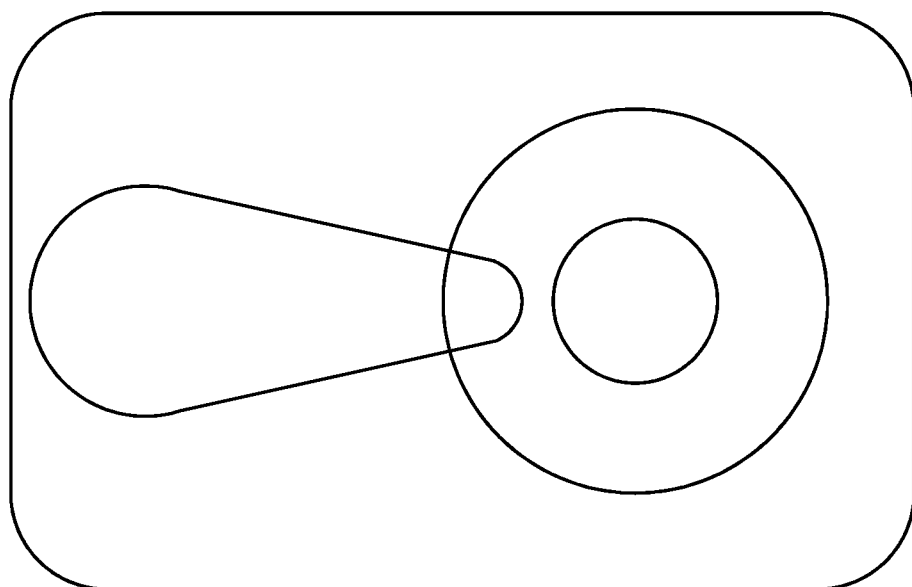
FIG. 43 is a bottom view of a head associated with the engine block of FIG. 42, the head defining a recess creating a corridor connecting the valves to the combustion chamber of the engine block.
Figure 44:
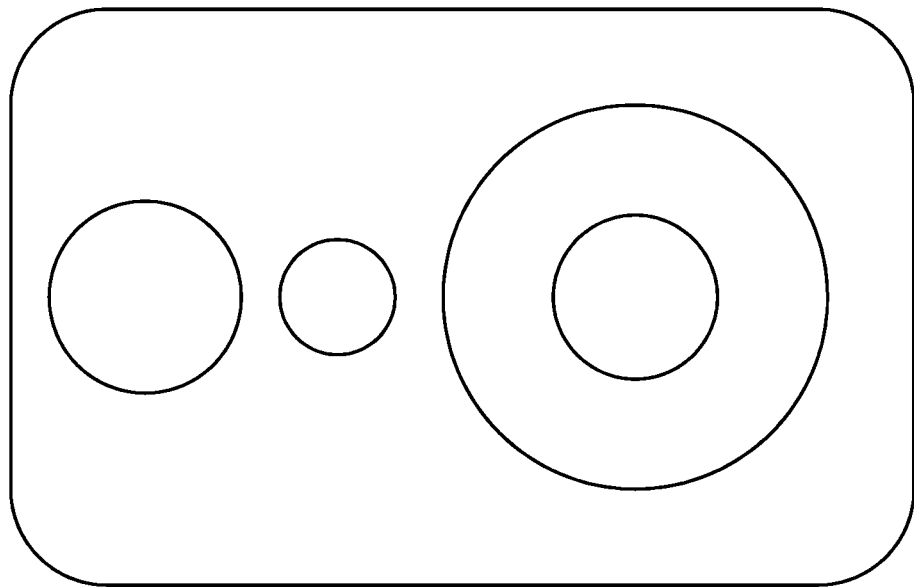
FIG. 44 shows a top view of an embodiment of engine block having two side valves positioned inline with the engine crank
Figure 45:
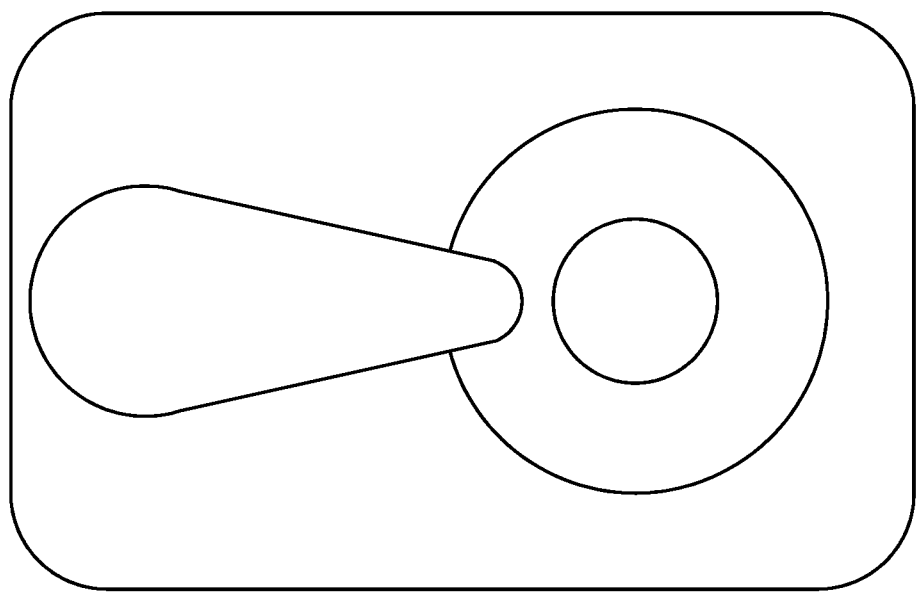
FIG. 45 is a bottom view of a head associated with the engine block of FIG. 44, the head defining a recess creating a corridor connecting the valves to the combustion chamber of the engine block.
Figure 46:
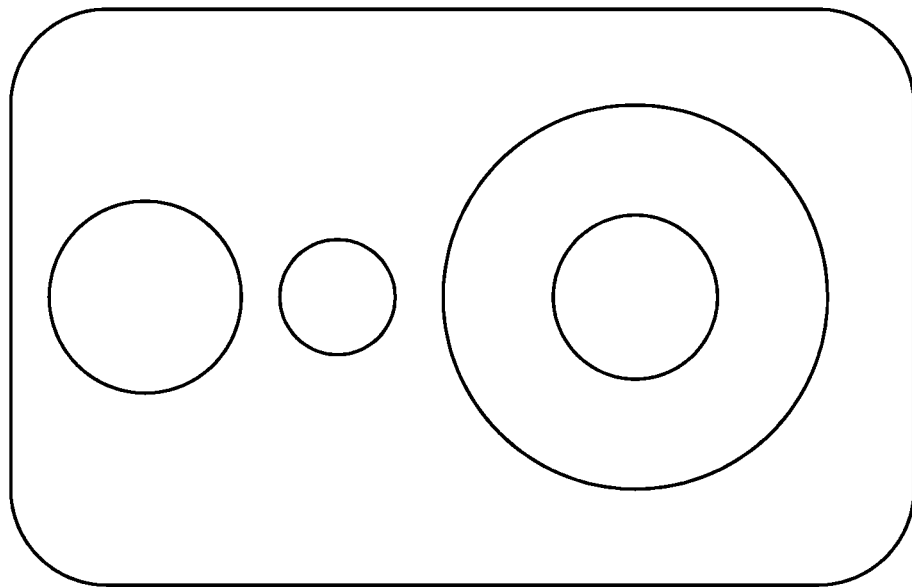
FIG. 46 shows a top view of an embodiment of engine block having two side valves positioned inline with the engine crank
Figure 47:
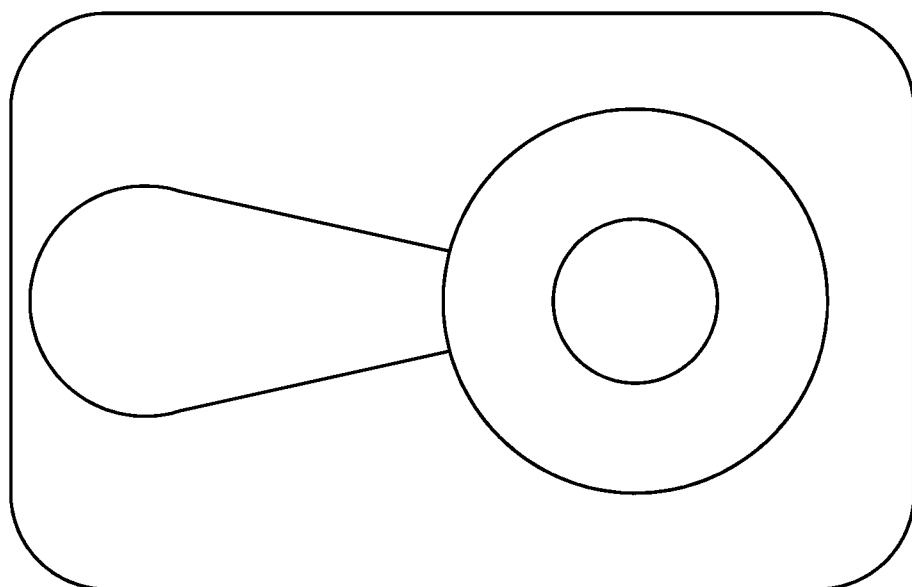
FIG. 47 is a bottom view of a head associated with the engine block of FIG. 46, the head defining a recess creating a corridor connecting the valves to the combustion chamber of the engine block.
Figure 48:
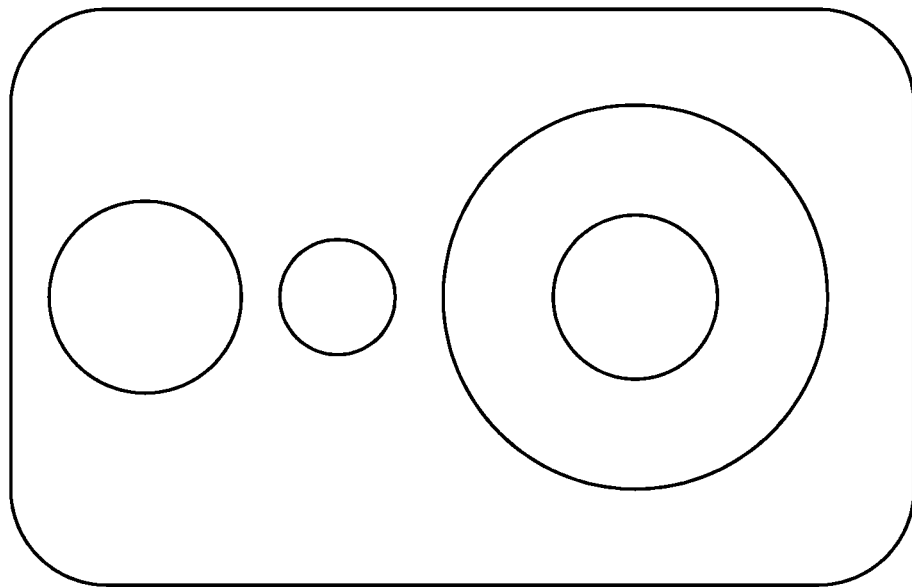
FIG. 48 shows a top view of an embodiment of engine block having two side valves positioned inline with the engine crank
Figure 49:
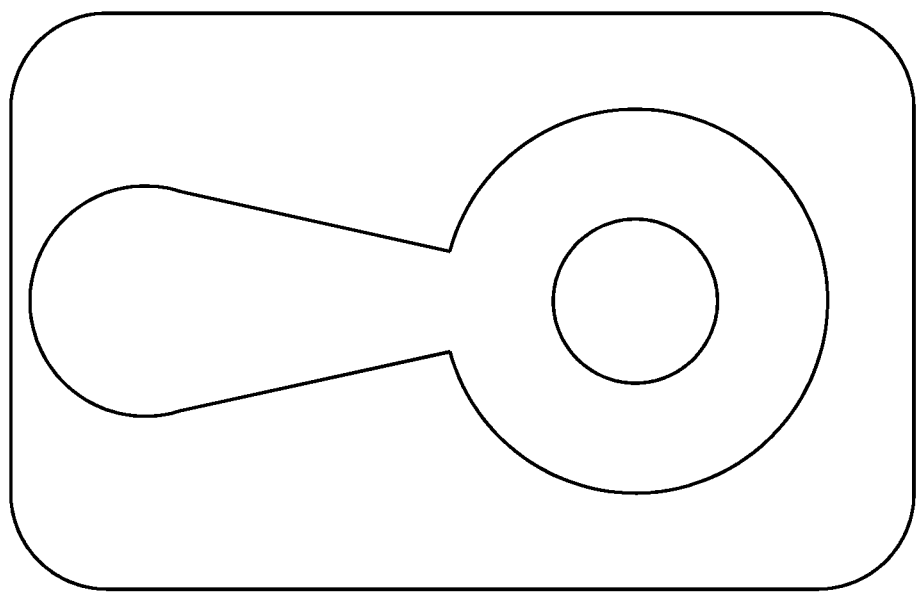
FIG. 49 is a bottom view of a head associated with the engine block of FIG. 48, the head defining a recess creating a corridor connecting the valves to the combustion chamber of the engine block.
Figure 50:
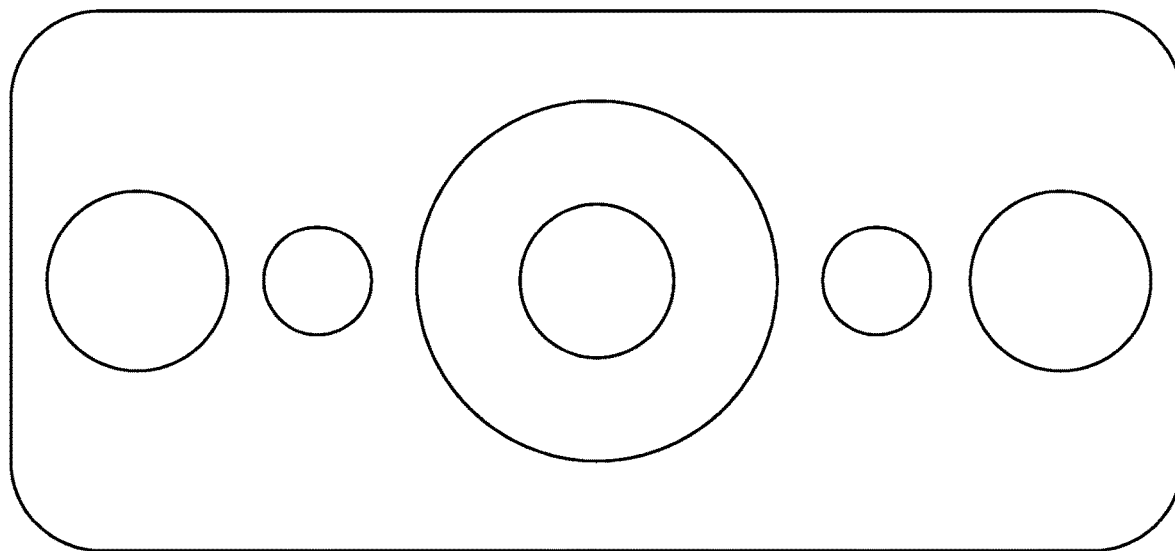
FIG. 50 shows a top view of an embodiment of engine block having four side valves positioned inline with the engine crank, two on each side of the cylinder.
Figure 51:
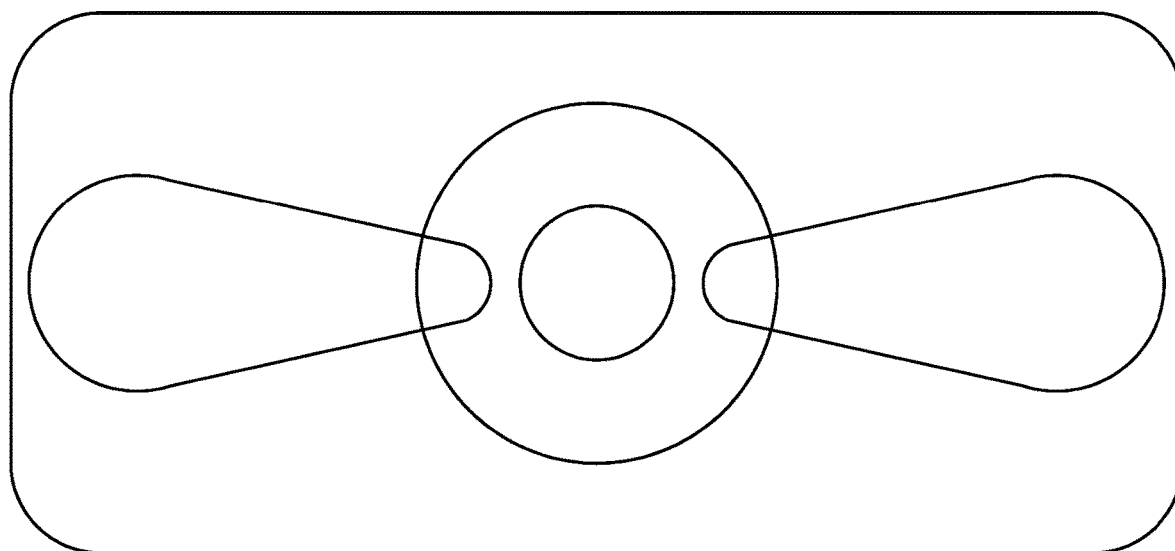
FIG. 51 is a bottom view of a head associated with the engine block of FIG. 50, the head defining a recess creating a corridor connecting the valves to the combustion chamber of the engine block.
Figure 52:
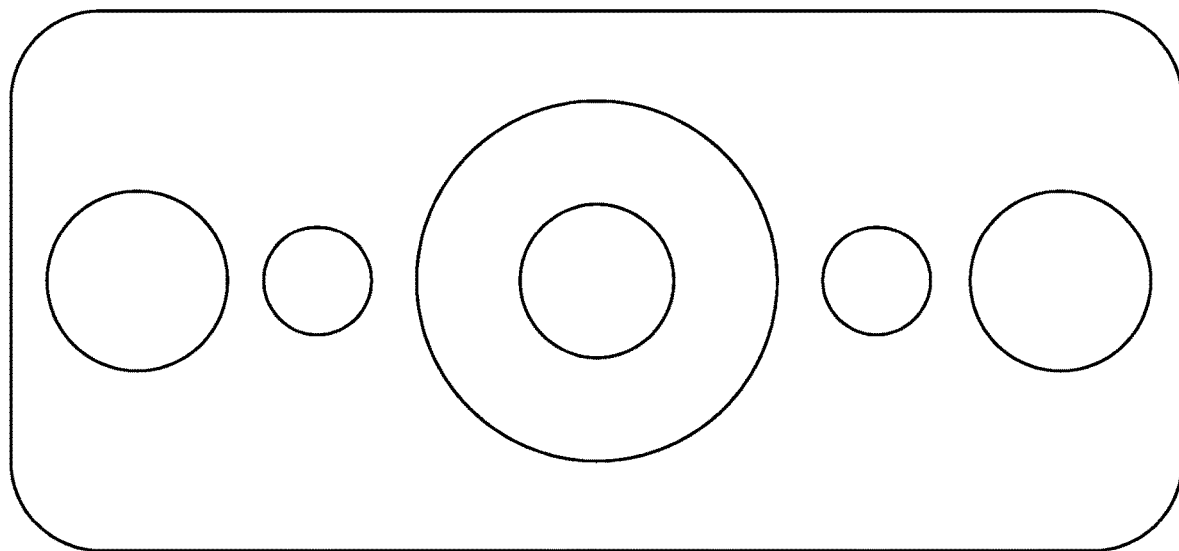
FIG. 52 shows a top view of an embodiment of engine block having four side valves positioned inline with the engine crank, two on each side of the cylinder.
Figure 53:
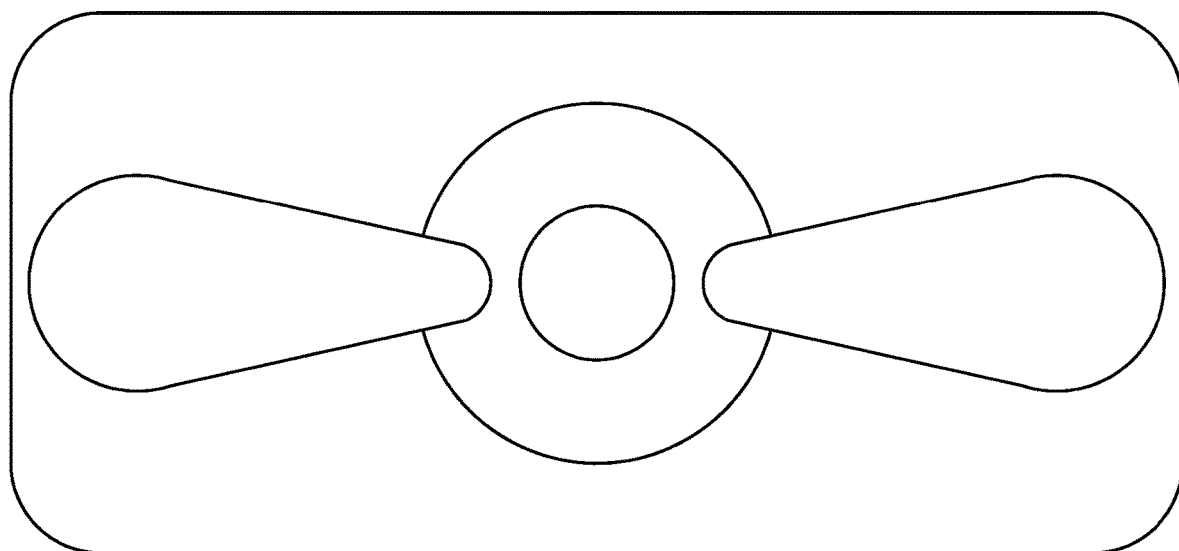
FIG. 53 is a bottom view of a head associated with the engine block of FIG. 52, the head defining a recess creating a corridor connecting the valves to the combustion chamber of the engine block.
Figure 54:
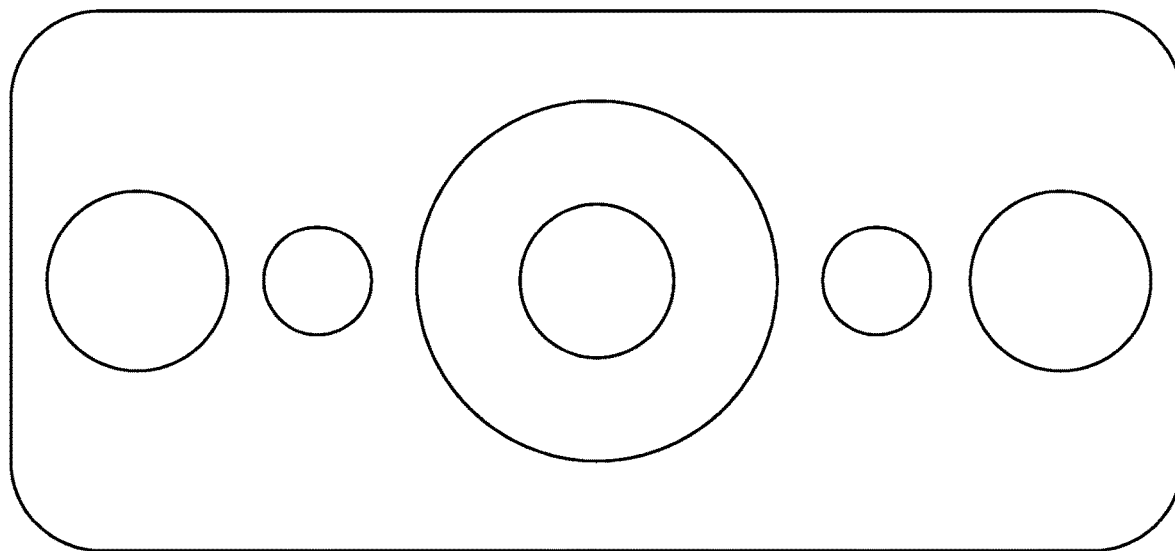
FIG. 54 shows a top view of an embodiment of engine block having four side valves positioned inline with the engine crank, two on each side of the cylinder.
Figure 55:
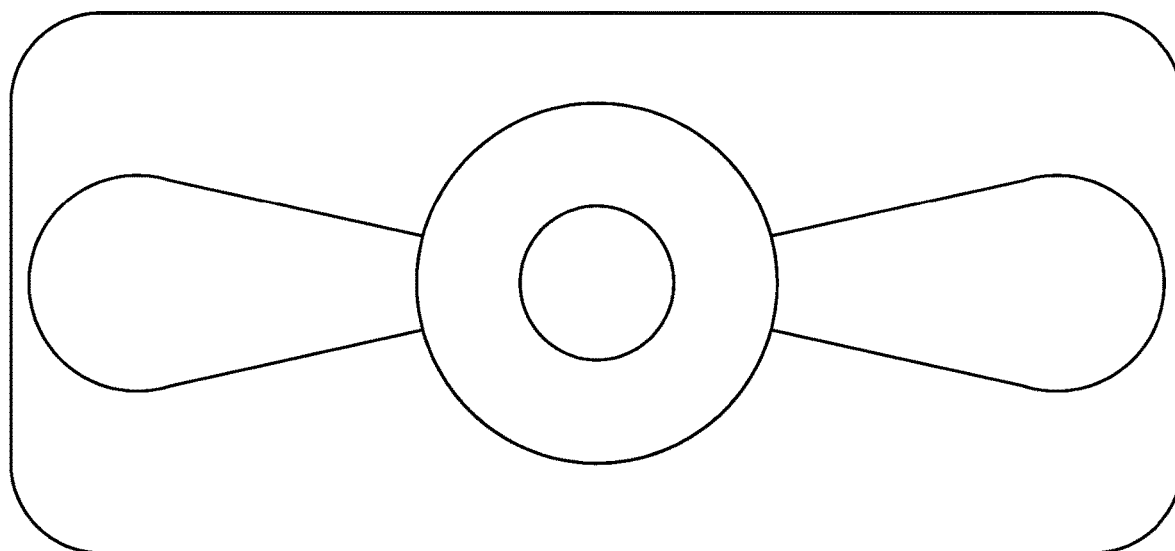
FIG. 55 is a bottom view of a head associated with the engine block of FIG. 54, the head defining a recess creating a corridor connecting the valves to the combustion chamber of the engine block.
Figure 56:
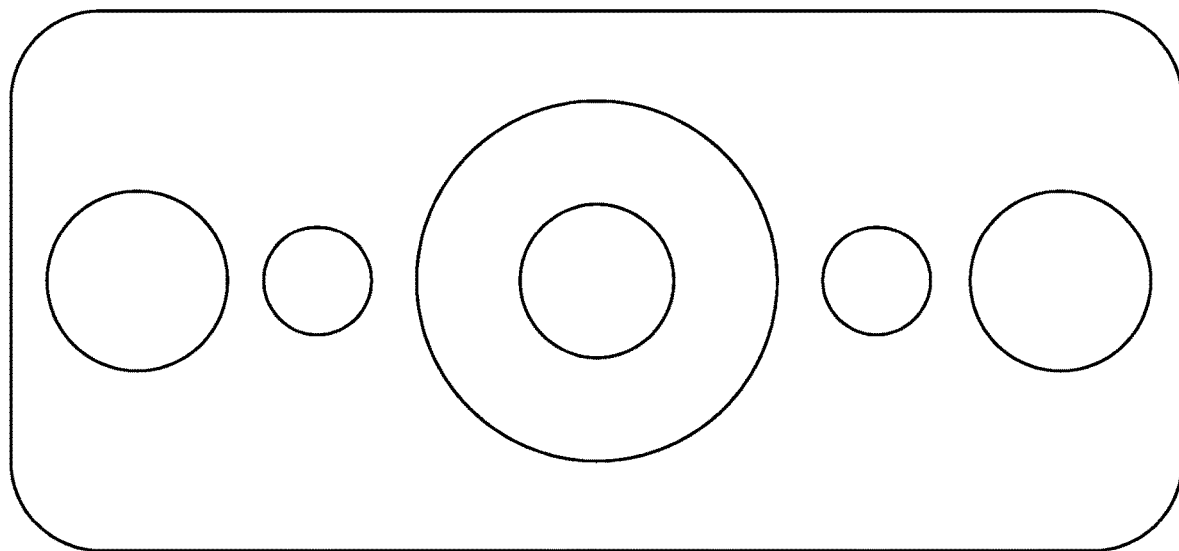
FIG. 56 shows a top view of an embodiment of engine block having four side valves positioned inline with the engine crank, two on each side of the cylinder.
Figure 57:
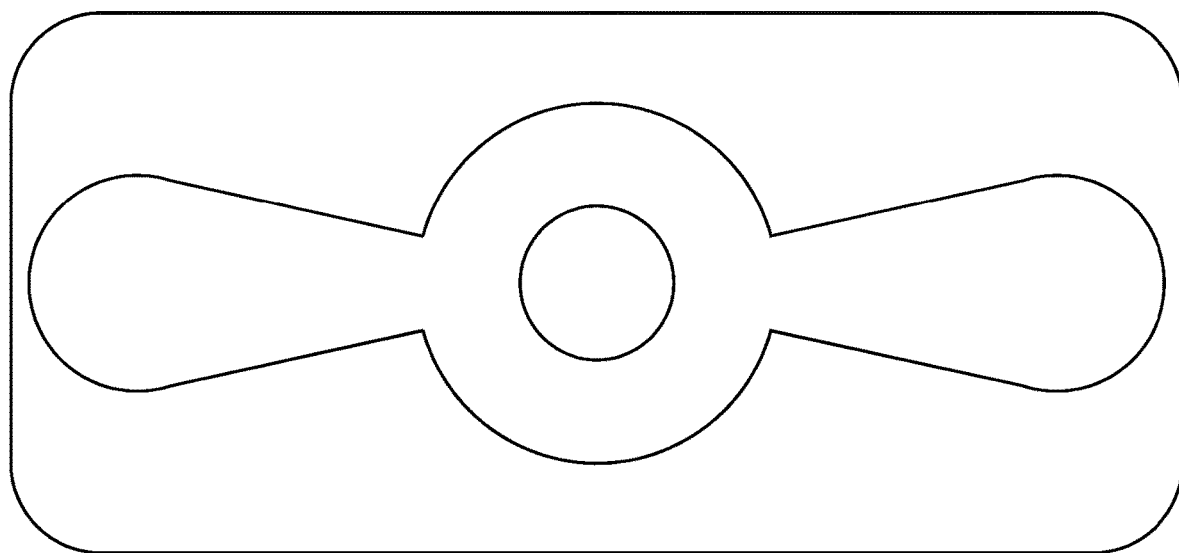
FIG. 57 is a bottom view of a head associated with the engine block of FIG. 56, the head defining a recess creating a corridor connecting the valves to the combustion chamber of the engine block.
Figure 58:
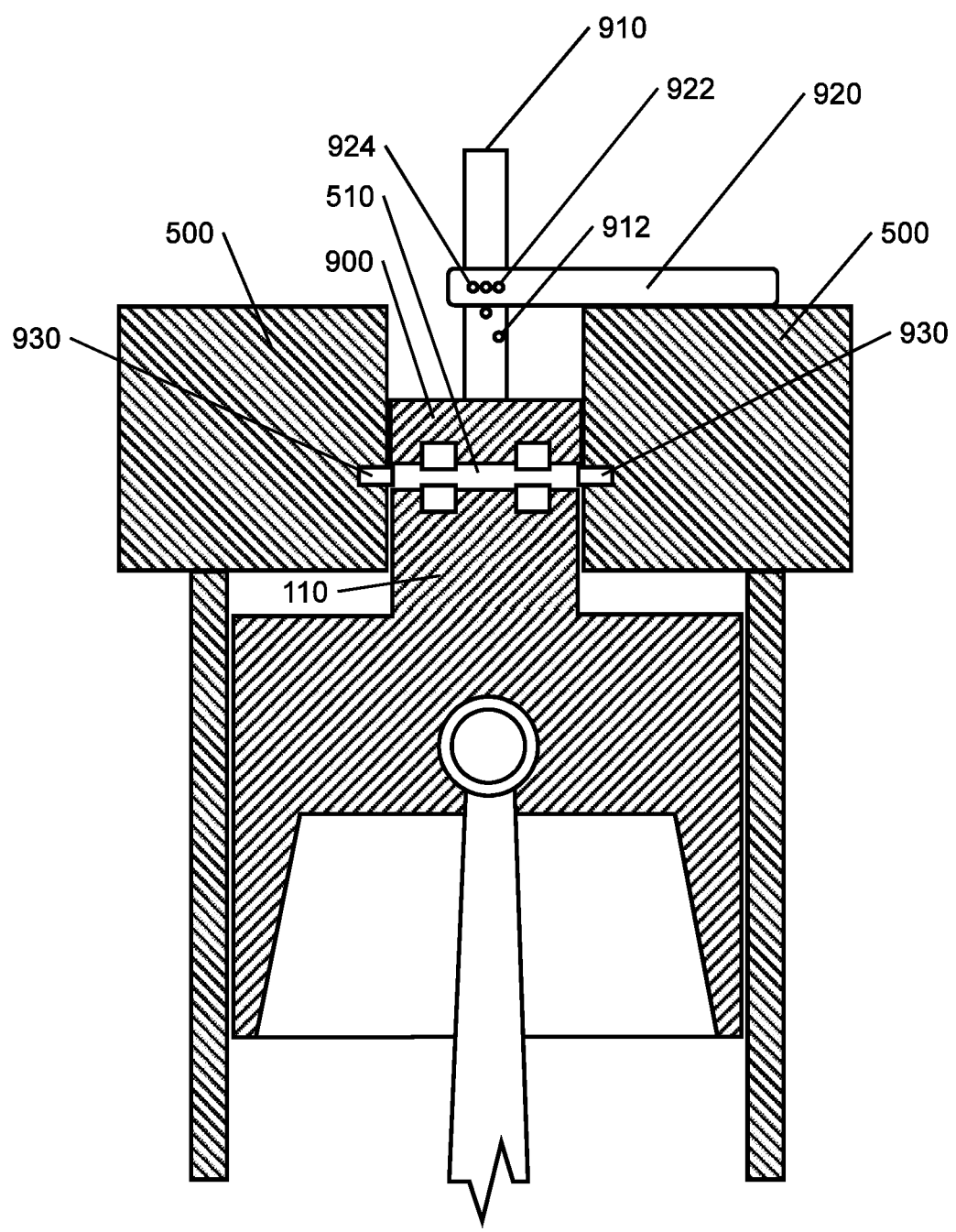
FIG. 58 shows a cross-sectional view of a representation of an engine of the present invention, a piston of the engine shown at top dead center and a variable compression ratio piston of the engine shown in a first location.
Figure 59:
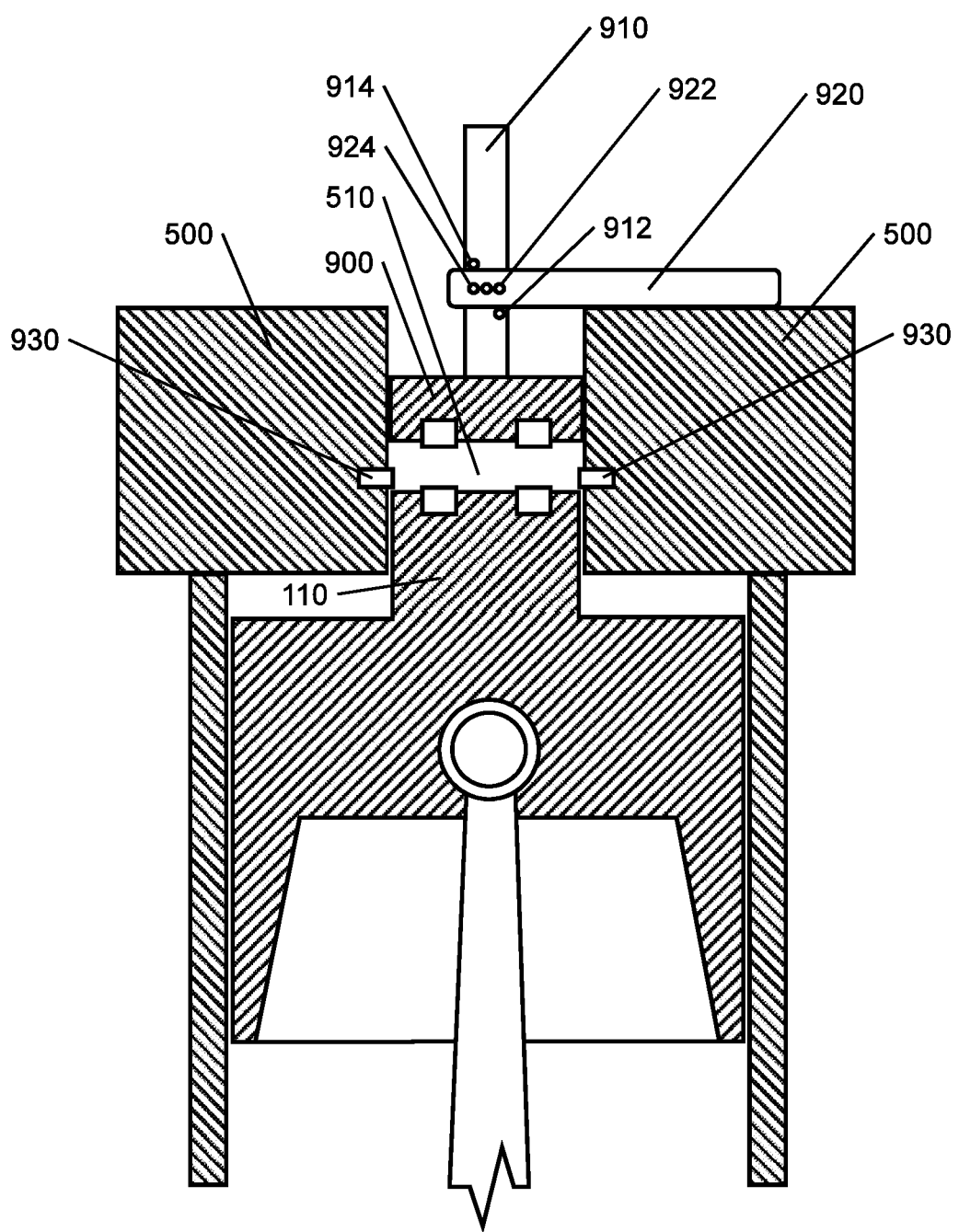
FIG. 59 shows a cross-sectional view of FIG. 58 with the variable compression ration piston shown in an intermediate location.
Figure 60:
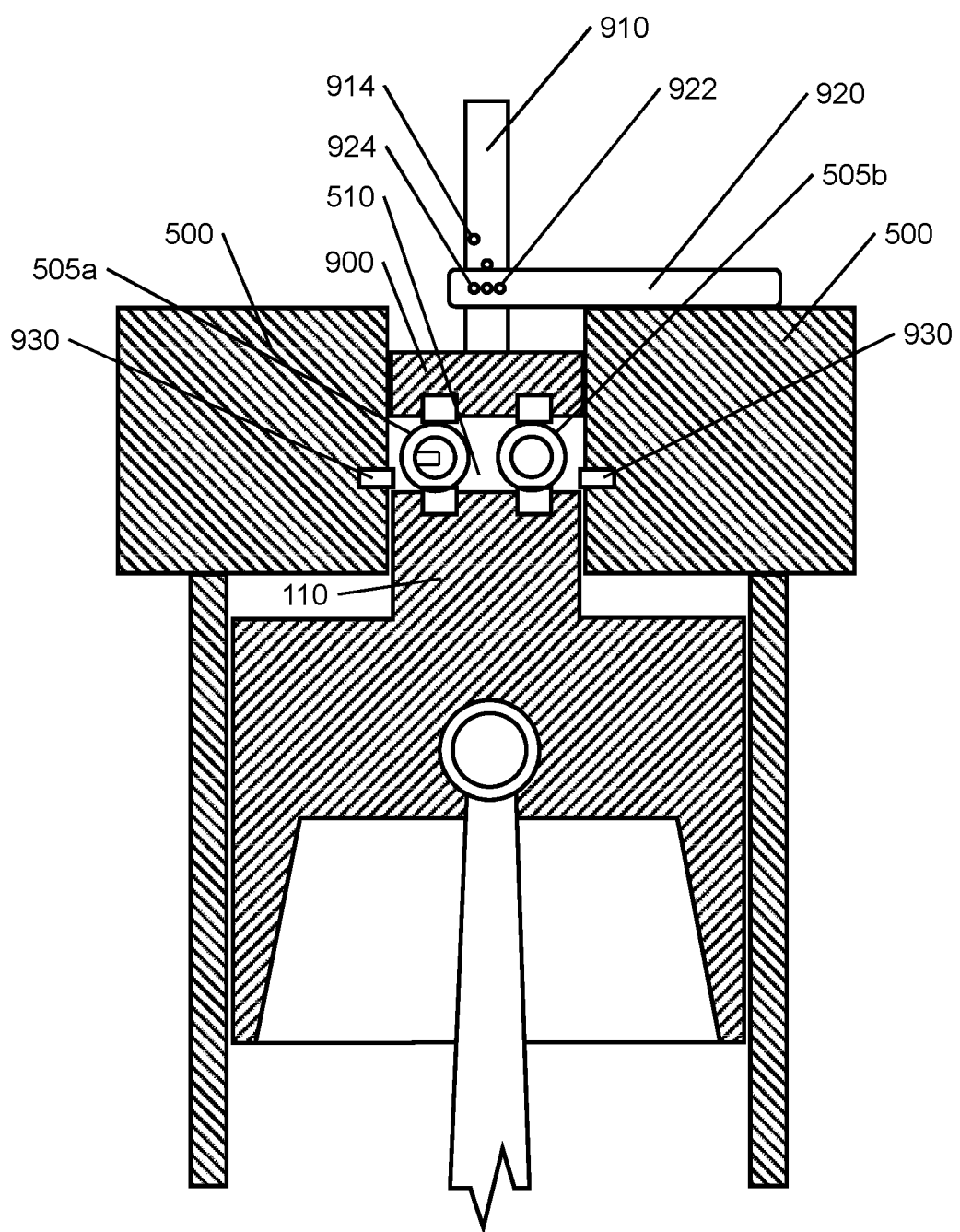
FIG. 60 shows a cross-sectional view of FIG. 58 with the variable compression ration piston shown in a second location.
Figure 61:
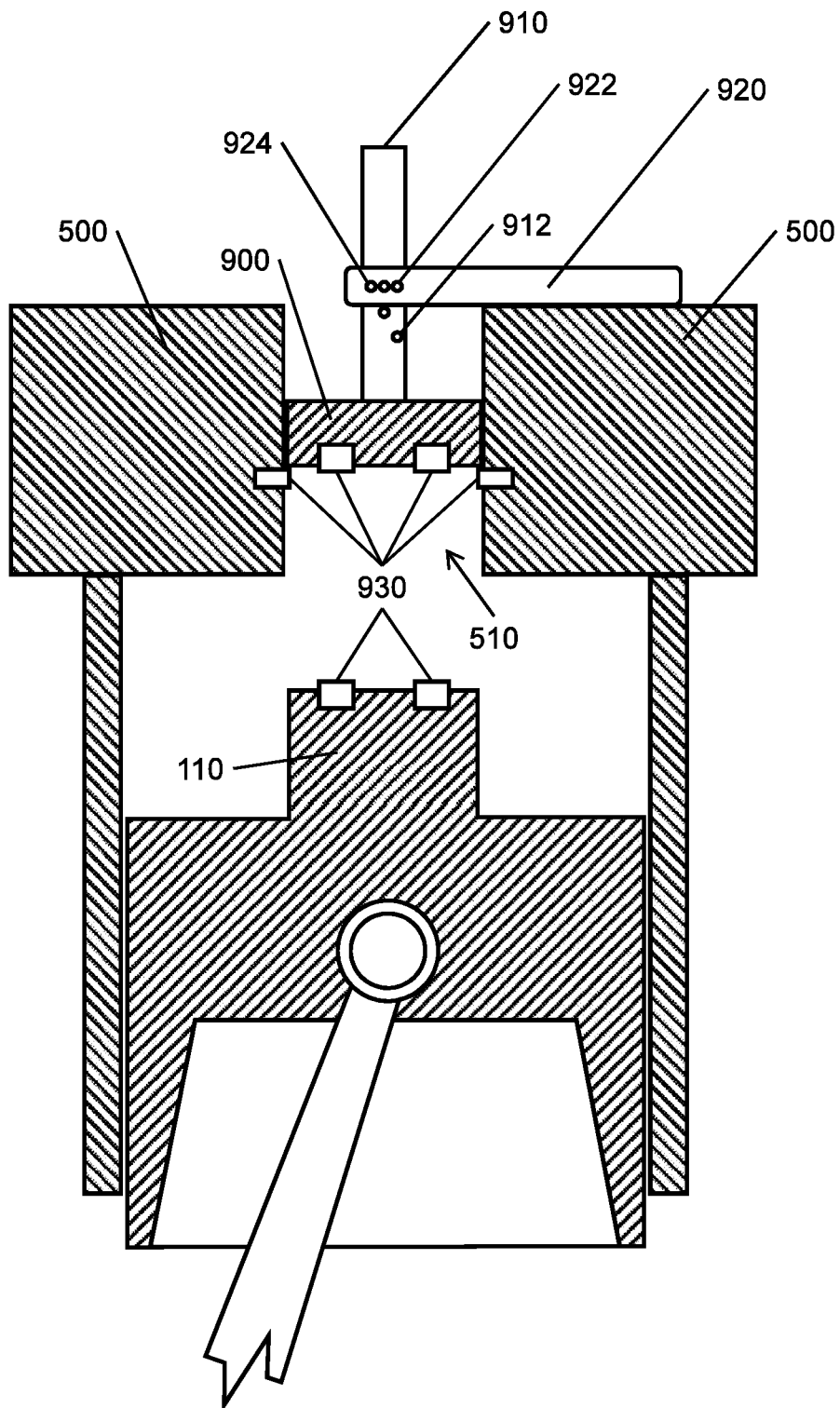
FIG. 61 shows a cross-sectional view of FIG. 58 with the piston shown displaced from top dead center.

In the embodiment shown in FIGS. 23-25, a central intake valve (or in some embodiments an exhaust valve, or in some embodiments and combination exhaust/intake valve) is located within the recess that receives the nipple portion of the piston. In some embodiments, the central valve helps to reduce and/or eliminate trap volume. In some embodiments, the central valve is not needed to reduce trap volume as the control of the multiple valves to the sides of the piston create a cyclonic action within the combustion chamber that helps to evacuate the recess. In some embodiments the side valves are located on only one side of the piston. In some such embodiments, only a single intake and single exhaust valve is utilized to the side of the piston along with the central valve within the recess.

In some embodiments, engine blocks include one or more group of side valves positioned on one or more side of a piston. In some embodiments a center valve of a group of three valves is an exhaust valve and the valve on either side of the exhaust valve is an intake valve, or vice versa. In other embodiments, a center valve of a group of three valves performs the same function (intake or exhaust) as one or more end valve of the group. In some embodiments the valves are positioned along an arc (FIG. 26, 27) or other curve. In some embodiments the valves are positioned along a straight line, such as a straight line extending in a tangential (FIG. 36), slanted (FIG. 38), or radial (FIG. 42) direction.

In some embodiments, a center valve of a first group of valves is an exhaust valve and a corresponding center valve of a second group of valves is an intake valve. In some embodiments, two exhaust valves and one intake valve are located adjacent to a first side of a piston and one exhaust valve and two intake valves are located adjacent to a second side of the piston such that half of the valves are exhaust valves and the other half of the valves are intake valves. In yet other embodiments, each valve located adjacent to the first side of the piston is an exhaust valve and each valve located adjacent to the second side of the piston is an intake valve. It will be appreciated that other embodiments include different numbers and/or configurations of valves and/or varying sizes of valves (e.g. different sizes than shown in the various drawings and/or at least one valve within a set of valves being different in size from at least one other valve).

In some embodiments, a corresponding head includes one or more recess area for connecting one or more valve or set of valves to one or more combustion chamber of the engine block. In some embodiments, one or more recess defines one or more corridor. In some embodiments, first and second corridors connect respective first and second groups of valves to respective first and second combustion chambers. In some embodiments, first and second corridors connect respective first and second valves of a first group of valves to respective first and second combustion chambers. In some embodiments, a first corridor connects a first valve to a first combustion chamber and a second corridor connects the first combustion chamber to a second valve and/or to a second combustion chamber.

Referring to FIGS. 42-57, some embodiments include two or more valves positioned along a straight line extending in a radial direction. In some such embodiments, a distal valve defining a first diameter is larger than a second diameter of a proximal valve. It will be appreciated that other configurations include valves positioned along different lines (or not along lines at all) and/or having different placement and/or size configurations. In some embodiments, side valves are located on the front/flywheel side of the engine block. In some embodiments, the side valves are located on the rear side of the engine block.

In some embodiments, a distal valve is an intake valve and a proximal valve is an exhaust valve. In some embodiments, the intake valve defines a first diameter that is larger than a second diameter of the exhaust valve. In other embodiments the intake valve is the same size as the exhaust valve. In still other embodiments, the intake valve is smaller than the exhaust valve. In some embodiments, the location of the valves and air flow created through the valves allows and/or facilitates heat to soak away from one or more hot spot location of the engine. In some embodiments, improved balance of heat throughout the cylinder allows for and/or facilitates greater control and use of compression ignition.

In some embodiments, the piston includes a central protuberance/nipple that is associated with a central recess in the head. In some embodiments a valve is not included within the central recess. In some embodiments, the head, block, valve, and pistons are configured so as to provide sufficient air flow to eliminate and/or control trap volume within the entire combustion chamber. In some such embodiments, a valve within the central recess valve is not required to eliminate and/or control trap volume. In some embodiments, a central valve is included within the central recess in some embodiments to further control trap volume.

The valves shown and described in the above-embodiments of the inventive concept are controlled in various embodiments by mechanical, electrical, mechanical-electrical, hydraulic, combinations thereof, and/or other mechanisms for actuation now known or hereafter discovered. Although cam and rocker arm assemblies are shown in some embodiments above, it will be appreciated that in other embodiments, other valve actuation mechanisms will be utilized in connection with the same or similar features of the inventive concept therein described. In various embodiments, intake and exhaust valves are actuated in or out of sequence, depending upon design and performance desired.

Although not shown and described herein, it will be appreciated that various embodiments of the Siamese cylinder inventive concept are employed with the various features, combinations and subcombinations of the other systems and methods of compression ignition disclosed herein.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall within the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. An internal combustion engine comprising:
    a cylinder;
    a first piston located within said cylinder, said first piston including a protuberance and being configured to move between a top-dead-center ("TDC") and a bottom-dead-center ("BDC") configuration, thereby defining a stroke of the first piston;
    a cylinder head enclosing said first piston within said cylinder, said cylinder head including a recess associated with said protuberance; and
    a second piston,
    wherein said cylinder, cylinder head, and recess define a combustion chamber having a primary chamber and a secondary chamber,
    wherein the engine is configured to facilitate a dual-ignition combustion process, a first ignition process occurring in the primary chamber and a second ignition process occurring in the secondary chamber as the first piston is moving away from TDC,
    wherein the primary chamber defines a first volume when the first piston is at TDC,
    wherein the second piston is a variable compression ratio piston associated with the primary chamber, and
    wherein the second piston is moveable between a first position and a second position, the first and second positions of the second piston being associated with maximum and minimum values of the first volume, respectively,
    the engine further comprising a control system having first and second sensors associated with respective first and second features of the second piston such that the first and second sensors are aligned with respective first and second features when the second piston is in respective first and second positions.

2. The engine as claimed in claim 1, wherein said recess is configured to receive said protuberance when said piston is at the TDC configuration, thereby separating the combustion chamber into the primary and secondary chambers, and wherein the second ignition process comprises expansion of fluid into the secondary chamber from the primary chamber as said piston moves away from TDC, thereby opening said primary chamber to said secondary chamber.

3. The engine as claimed in claim 2, further comprising a spark plug extending into the primary chamber, the spark plug being configured to selectively initiate the first ignition process.

4. The engine as claimed in claim 3, further comprising a glow plug extending into the primary chamber, the glow plug being configured to selectively initiate the first ignition process.

5. The engine as claimed in claim 2, further comprising a glow plug extending into the primary chamber, the glow plug being configured to selectively initiate the first ignition process.

6. The engine as claimed in claim 1 wherein the first ignition process is a compression ignition process.

7. The engine as claimed in claim 6, wherein the second ignition process occurs after said first piston has moved away from TDC.

8. The engine as claimed in claim 1, further comprising a linkage assembly for moving the second piston between its first and second positions, thereby adjusting compression ratios associated with the primary chamber.

9. The engine as claimed in claimf wherein said linkage assembly is configured to selectively secure said second piston at its first position, at its second position, or at one of a plurality of intermediate positions.

10. The engine as claimed in claim 1, wherein said control system further comprises an intermediate sensor associated with an intermediate feature of the second piston such that the intermediate sensor is aligned with the intermediate feature when the second piston is in a respective intermediate position.

11. The engine as claimed in claim 1, further comprising an insert at least partially embedded in a first component, wherein the first component is one of the first piston, the head, and the second piston, wherein the first component is formed from a first material, wherein the insert is formed from a second material having heat transfer properties that are different from heat transfer properties of the first material such that a rate of heat transfer is increased, and wherein the insert is positioned and configured so as to be in thermal communication with the primary chamber.

12. An internal combustion engine comprising:
    a cylinder;
    a first piston located within said cylinder, said first piston including a protuberance and being configured to move between a top-dead-center ("TDC") and a bottom-dead-center ("BDC") configuration, thereby defining a stroke of the first piston;

a cylinder head enclosing said first piston within said cylinder, said cylinder head including a recess associated with said protuberance;
an insert at least partially embedded in a first component;
wherein said cylinder, cylinder head, and recess define a combustion chamber having a primary chamber and a secondary chamber;
wherein the engine is configured to facilitate a dual-ignition combustion process, a first ignition process occurring in the primary chamber and a second ignition process occurring in the secondary chamber as the first piston is moving away from TDC,
wherein the first component is one of the first piston, the head, and the second piston,
wherein the first component is formed from a first material,
wherein the insert is formed from a second material having heat transfer properties that are different from heat transfer properties of the first material, and
wherein the insert is positioned and configured so as to be in thermal communication with the primary chamber.

13. The engine as claimed in claim 12, further comprising a plurality of inserts, each insert being at least partially embedded in one of the first piston, the head, and the second piston.

14. An internal combustion engine comprising:
a cylinder;
a first piston located within said cylinder, said first piston including a protuberance and being configured to move between a top-dead-center ("TDC") and a bottom-dead-center ("BDC") configuration, thereby defining a stroke of the first piston;
a cylinder head enclosing said first piston within said cylinder, said cylinder head including a recess associated with said protuberance; and
a second piston,
wherein said cylinder, cylinder head, and recess define a combustion chamber having a primary chamber and a secondary chamber,
wherein the primary chamber defines a first volume when the first piston is at TDC,
wherein the second piston is a variable compression ratio piston associated with the primary chamber, and
wherein the second piston is moveable between a first position and a second position, the first and second positions of the second piston being associated with maximum and minimum values of the first volume, respectively,
the engine further comprising:
a linkage assembly for moving the second piston between its first and second positions, thereby adjusting compression ratios associated with the primary chamber; and
a control system having first and second sensors associated with respective first and second features of the second piston such that the first and second sensors are aligned with respective first and second features when the second piston is in respective first and second positions.

\* \* \* \* \*

UNITED STATES PATENT AND TRADEMARK OFFICE
CERTIFICATE OF CORRECTION

PATENT NO. : 10,927,750 B2  
APPLICATION NO. : 15/948089  
DATED : February 23, 2021  
INVENTOR(S) : Matthew T. Riley Page 1 of 1

It is certified that error appears in the above-identified patent and that said Letters Patent is hereby corrected as shown below:

In the Claims

Column 26, Line 41, Claim 9: the claim reference numeral should read -8-

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*